(12) United States Patent
Small et al.

(10) Patent No.: US 9,229,231 B2
(45) Date of Patent: Jan. 5, 2016

(54) UPDATING PRINTED CONTENT WITH PERSONALIZED VIRTUAL DATA

(75) Inventors: Sheridan Martin Small, Seattle, WA (US); Alex Aben-Athar Kipman, Redmond, WA (US); Benjamin I. Vaught, Seattle, WA (US); Kathryn Stone Perez, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 177 days.

(21) Appl. No.: 13/346,674

(22) Filed: Jan. 9, 2012

(65) Prior Publication Data

US 2013/0147838 A1      Jun. 13, 2013

Related U.S. Application Data

(63) Continuation-in-part of application No. 13/313,368, filed on Dec. 7, 2011.

(51) Int. Cl.
*G09G 5/00* (2006.01)
*G02B 27/01* (2006.01)
(Continued)

(52) U.S. Cl.
CPC ............ *G02B 27/017* (2013.01); *G06F 3/013* (2013.01); *G06F 3/017* (2013.01); *G06F 3/0483* (2013.01);
(Continued)

(58) Field of Classification Search
CPC ....... G06T 19/006; G06T 19/00; G06F 3/011; G06F 3/012; G06F 3/0304
USPC ................... 345/7, 8, 632, 633; 715/757, 863
See application file for complete search history.

(56) References Cited

U.S. PATENT DOCUMENTS 5,954,515 A    9/1999  Iggulden
6,175,343 B1   1/2001  Mitchell et al.
(Continued)

FOREIGN PATENT DOCUMENTS

CN        1568453      1/2005
CN      102142005      8/2011
(Continued)

OTHER PUBLICATIONS

Liarokapis, Fotis, "An Augmented Reality Interface for Visualizing and Interacting with Virtual Content", Draft Paper to Appear in Journal of Virtual Reality, vol. 11, Issue 1, Feb. 2007, 18 pages.
(Continued)

*Primary Examiner* — Jeffery A Brier
*Assistant Examiner* — Todd Buttram
(74) *Attorney, Agent, or Firm* — Dan Choi; Judy Yee; Micky Minhas

(57) ABSTRACT

The technology provides for updating printed content with personalized virtual data using a see-through, near-eye, mixed reality display device system. A printed content item, for example a book or magazine, is identified from image data captured by cameras on the display device, and user selection of a printed content selection within the printed content item is identified based on physical action user input, for example eye gaze or a gesture. Virtual data is selected from available virtual data for the printed content selection based on user profile data, and the display device system displays the selected virtual data in a position registered to the position of the printed content selection. In some examples, a task related to the printed content item is determined based on physical action user input, and personalized virtual data is displayed registered to the printed content item in accordance with the task.

18 Claims, 23 Drawing Sheets

(51) Int. Cl.

| | | |
|---|---|---|
| *G06F 3/01* | (2006.01) | |
| *G06F 3/0483* | (2013.01) | |
| *G06F 3/16* | (2006.01) | |
| *G10L 15/22* | (2006.01) | |

(52) U.S. Cl.
CPC .......... *G06F 3/167* (2013.01); *G02B 2027/014* (2013.01); *G02B 2027/0138* (2013.01); *G10L 2015/228* (2013.01)

(56) References Cited

U.S. PATENT DOCUMENTS

| | | |
|---|---|---|
| 6,266,057 B1 | 7/2001 | Kuzunuki et al. |
| 6,408,257 B1 | 6/2002 | Harrington et al. |
| 6,427,140 B1 | 7/2002 | Ginter et al. |
| 6,457,024 B1 | 9/2002 | Felsentein et al. |
| 6,466,975 B1 | 10/2002 | Sterling |
| 6,788,293 B1 | 9/2004 | Silverbrook et al. |
| 6,947,219 B1 | 9/2005 | Ou |
| 7,289,130 B1 | 10/2007 | Satoh et al. |
| 7,372,451 B2 | 5/2008 | Dempski |
| 7,509,570 B2 | 3/2009 | Narusawa |
| 7,774,075 B2 | 8/2010 | Lin |
| 7,837,094 B2 | 11/2010 | Rhoads |
| 7,848,573 B2 | 12/2010 | Wecker et al. |
| 7,969,383 B2 | 6/2011 | Eberl et al. |
| 2003/0043144 A1 | 3/2003 | Pundarika et al. |
| 2003/0059762 A1 | 3/2003 | Fujiwara et al. |
| 2004/0008368 A1 | 1/2004 | Plunkett et al. |
| 2004/0104935 A1 | 6/2004 | Williamson et al. |
| 2005/0143172 A1 | 6/2005 | Kurzweil |
| 2006/0028400 A1* | 2/2006 | Lapstun et al. .................. 345/8 |
| 2006/0122905 A1 | 6/2006 | Marshall et al. |
| 2006/0141436 A1 | 6/2006 | Rines |
| 2006/0150848 A1 | 7/2006 | Deutsch |
| 2006/0244677 A1 | 11/2006 | Dempski |
| 2007/0005795 A1* | 1/2007 | Gonzalez ...................... 709/232 |
| 2007/0093169 A1 | 4/2007 | Blaszczyk et al. |
| 2007/0104036 A1 | 5/2007 | Prax et al. |
| 2007/0226321 A1 | 9/2007 | Bengtson |
| 2007/0285338 A1 | 12/2007 | Yanagisawa |
| 2008/0266323 A1 | 10/2008 | Biocca et al. |
| 2009/0243967 A1 | 10/2009 | Kato |
| 2009/0243968 A1 | 10/2009 | Nakazawa |
| 2009/0278766 A1 | 11/2009 | Sako et al. |
| 2010/0048242 A1 | 2/2010 | Rhoads et al. |
| 2010/0111405 A1 | 5/2010 | Lee et al. |
| 2010/0149073 A1 | 6/2010 | Chaum et al. |
| 2010/0199232 A1 | 8/2010 | Mistry et al. |
| 2010/0208302 A1 | 8/2010 | Lee |
| 2011/0018903 A1 | 1/2011 | Lapstun et al. |
| 2011/0029443 A1* | 2/2011 | King et al. ..................... 705/310 |
| 2011/0081867 A1 | 4/2011 | Issa et al. |
| 2011/0096401 A1 | 4/2011 | Levola |
| 2011/0141511 A1 | 6/2011 | Milanski et al. |
| 2011/0148924 A1 | 6/2011 | Tapley et al. |
| 2011/0167350 A1 | 7/2011 | Hoellwarth |
| 2011/0181497 A1 | 7/2011 | Raviv |
| 2011/0187744 A1 | 8/2011 | Kim et al. |
| 2011/0195388 A1 | 8/2011 | Henshall et al. |
| 2011/0205148 A1 | 8/2011 | Corriveau et al. |
| 2011/0216091 A1 | 9/2011 | Song et al. |
| 2011/0261030 A1 | 10/2011 | Bullock |
| 2011/0279479 A1 | 11/2011 | Rodriquez |
| 2011/0288964 A1 | 11/2011 | Linder et al. |
| 2011/0316806 A1 | 12/2011 | Lapstun et al. |
| 2012/0001923 A1 | 1/2012 | Weinzimmer et al. |
| 2012/0064204 A1 | 3/2012 | Davila et al. |
| 2012/0088543 A1 | 4/2012 | Lindner et al. |
| 2012/0154557 A1* | 6/2012 | Perez et al. ...................... 348/53 |
| 2012/0188148 A1* | 7/2012 | DeJong ............................ 345/8 |
| 2012/0188279 A1 | 7/2012 | Demaine |
| 2012/0249831 A1 | 10/2012 | Porter |
| 2012/0320092 A1 | 12/2012 | Shin et al. |
| 2012/0324493 A1* | 12/2012 | Holmdahl et al. .............. 725/12 |
| 2013/0016102 A1 | 1/2013 | Look et al. |
| 2013/0044128 A1* | 2/2013 | Liu et al. ........................ 345/633 |
| 2013/0044129 A1* | 2/2013 | Latta et al. .................... 345/633 |
| 2013/0044130 A1* | 2/2013 | Geisner et al. ................ 345/633 |
| 2013/0046616 A1 | 2/2013 | Williams et al. |
| 2013/0050432 A1* | 2/2013 | Perez et al. ..................... 348/47 |
| 2013/0054576 A1* | 2/2013 | Karmarkar et al. ........... 707/722 |
| 2013/0057891 A1 | 3/2013 | Aoki |
| 2013/0076788 A1* | 3/2013 | Ben Zvi ........................ 345/633 |
| 2013/0083003 A1* | 4/2013 | Perez et al. .................... 345/419 |
| 2013/0083333 A1 | 4/2013 | Lopez et al. |
| 2013/0169682 A1* | 7/2013 | Novak et al. ................... 345/633 |
| 2013/0235347 A1* | 9/2013 | Hennessey et al. ........... 351/210 |
| 2013/0298030 A1* | 11/2013 | Nahumi et al. ................ 715/733 |

FOREIGN PATENT DOCUMENTS

| | | |
|---|---|---|
| EP | 1060772 | 12/2000 |
| JP | 07177442 | 7/1995 |
| JP | 2001154637 | 6/2001 |
| JP | 2004133784 | 4/2004 |
| JP | 2007200261 | 8/2007 |
| JP | 2007214964 | 8/2007 |
| KR | 20000032647 | 6/2000 |
| KR | 20090036183 | 4/2009 |
| KR | 20090060421 | 6/2009 |
| WO | 0167214 | 9/2001 |

OTHER PUBLICATIONS

Veltman, Kim H., "Augmented Books, Knowledge, and Culture", In Proceedings of INET'2000, Jul. 2000, 93 pages.
U.S. Appl. No. 13/485,627, filed May 31, 2012.
Asai, et al., "Augmented Instructions—A Fusion of Augmented Reality and Printed Learning Materials", Proceedings of the Fifth IEEE International Conference on Advanced Learning Technologies, IEEE Computer Society, Jul. 5-8, 2005, pp. 213-215. 3 pages.
Biggs, John, "CMU Researchers Turn Any Surface Into a Touchscreen," TechCrunch [online], Oct. 17, 2011 [retrieved on Oct. 21, 2011], Retrieved from the Internet: <URL:http://techcrunch.com/2011/10/17/cmu-researchers-turn-any-surface-into-a-touchscreen/>, 6 pages.
Billinghurst et al., "MagicBook: Transitioning between Reality and Virtuality," Proceedings of the 2001 Conference on Human Factors in Computing Systems (CHI '01), Mar. 31-Apr. 5, 2001, Seattle, WA, USA. 2 pages.
Card, et al., "3Book: A Scalable 3D Virtual Book," Proceedings of the 2004 Conference on Human Factors in Computing Systems (CHI '04), Apr. 24-29, 2004, in Vienna, Austria, ACM, 4 pages.
Dachselt, et al., "Interacting with Printed Books Using Digital Pens and Smart Mobile Projection," Proceedings of the Workshop on Mobile and Personal Projection (MP2) (CHI '11), ACM, Vancouver, Canada, May 7-12, 2011, 5 pages.
Grasset, et al., "Edutainment with a Mixed Reality Book: A Visually Augmented Illustrative Childrens' Book," Proceedings of the International Conference on Advances in Computer Entertainment Technology, 2008, pp. 292-295, 4 pages.
Grasset, et al., "The Design of a Mixed-Reality Book: Is It Still a Real Book?," Proceedings of the 7th IEEE/ACM International Symposium on Mixed and Augmented Reality, Sep. 15-18, 2008, pp. 99-102, 4 pages.
Hanheide, Marc, "A Cognitive Ego-Vision System for Interactive Assistance", Bielefeld University, Oct. 2006, 198 pages.
Hong, et al., "Annotating 3D Electronic Books," Proceedings of the Conference on Human Factors in Computing Systems (CHI '05), Apr. 2-7, 2005, in Portland, Oregon, ACM, 4 pages.
Weibel et al., "PaperProof: A Paper-Digital Proof-Editing System," Proceedings of the 2008 Conference on Human Factors in Computing Systems (CHI '08), Apr. 5-10, 2008, Florence, Italy, 13 pages.
Wu, et al., "Turning a Page on the Digital Annotation of Physical Books," Proceedings of the 2nd International Conference on Tangible and Embedded Interaction, Feb. 18-20, 2008, Bonn, Germany, ACM, 8 pages.
U.S. Appl. No. 13/313,368, filed Dec. 7, 2011.
U.S. Appl. No. 13/347,576, filed Jan. 10, 2012.

(56) References Cited

OTHER PUBLICATIONS

International Search Report and Written Opinion dated Mar. 18, 2013 in International Patent Application No. PCT/US2012/067647, 8 pages.
English abstract for JP2007200261 published Aug. 9, 2007.
International Search Report and Written Opinion dated Mar. 22, 2013 in International Patent Application No. PCT/US2012/067805, 7 pages.
English abstract for KR20000032647 published Jun. 15, 2000.
English abstract for KR20090036183 published Apr. 14, 2009.
International Search Report and Written Opinion dated Mar. 22, 2013 in International Patent Application No. PCT/US2012/067806, 7 pages.
English abstract for JP07177442 published Jul. 14, 1995.
English abstract for JP2001154637 published Jun. 8, 2001.
English abstract for JP2007214964 published Aug. 23, 2007.
English abstract for KR20090060421 published Jun. 12, 2009.
Office Action dated Oct. 23, 2013 in U.S. Appl. No. 13/347,576, 149 pages.
Office Action dated Nov. 5, 2013 in U.S. Appl. No. 13/313,368, 57 pages.
English Abstract for JP2004133784 published Apr. 30, 2004.
Response to Office Action filed Mar. 23, 2014 in U.S. Appl. No. 13/347,576, 14 pages.
Response to Office Action filed May 5, 2014 in U.S. Appl. No. 13/313,368, 17 pages.
Office Action dated Apr. 14, 2014 in U.S. Appl. No. 13/485,627, 110 pages.
Office Action dated Jun. 3, 2014 in U.S. Appl. No. 13/347,576, 28 pages.
Response to Office Action filed Aug. 13, 2014 in U.S. Appl. No. 13/485,627, 14 pages.
Response to Office Action filed Oct. 14, 2014 in U.S. Appl. No. 13/313,368, 9 pages.
Office Action filed Jul. 14, 2014 in U.S. Appl. No. 13/313,368, 35 pages.
Office Action dated Oct. 24, 2014 in U.S. Appl. No. 13/485,627, 52 pages.
Notice of Allowance dated Nov. 7, 2014 in U.S. Appl. No. 13/313,368, 13 pages.
"First Office Action and Search Report Issued in Chinese Patent Application No. 201210526353.6", with partial English translation, Mailed Date: Apr. 3, 2015, 17 Pages. (MS# 333392.03).
"First Office Action and Search Report Issued in Chinese Patent Application No. 201210525621.2", with partial English translation, Mailed Date: Apr. 3, 2015, 18 Pages. (MS# 334065.04).
First Office Action and Search Report, with partial English translation, dated May 5, 2015 in Chinese Patent Application No. 201210520999.3.
Response to Office Action filed Dec. 2, 2014 in U.S. Appl. No. 13/347,576.
Notice of Allowance and Fee(s) Due dated Jan. 30, 2015 in U.S. Appl. No. 13/347,576.
Response to Final Office Action filed Jan. 23, 2015 in U.S. Appl. No. 13/485,627.
Notice of Allowance and Fee(s) Due dated Feb. 3, 2015 in U.S. Appl. No. 13/485,627.
Notice of Allowance and Fee(s) Due dated Feb. 4, 2015 in U.S. Appl. No. 13/313,368.
Notice of Allowance and Fee(s) Due dated Feb. 27, 2015 in U.S. Appl. No. 13/485,627.

* cited by examiner

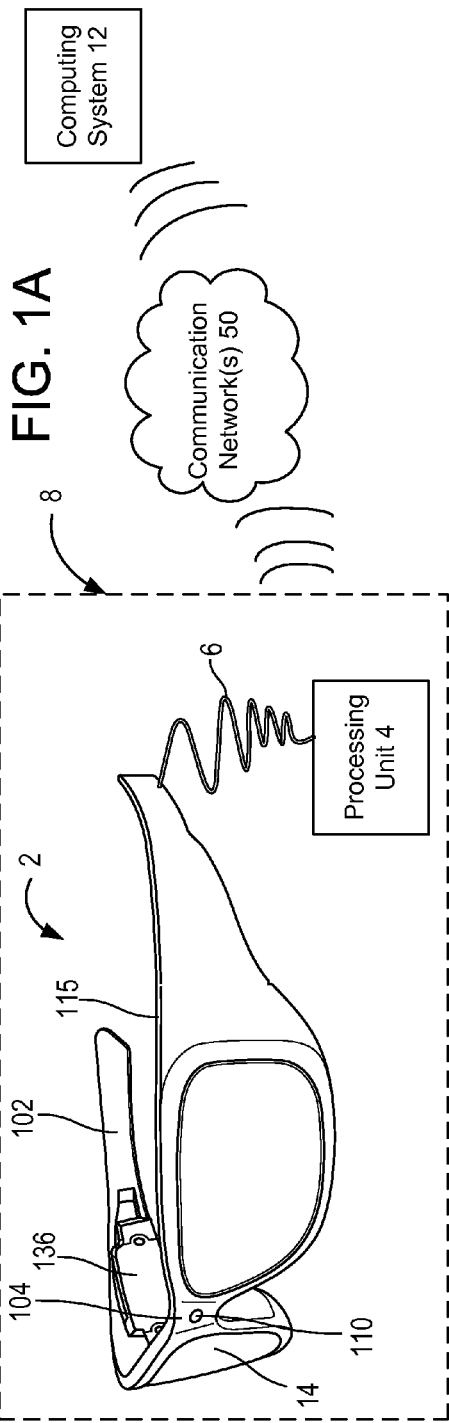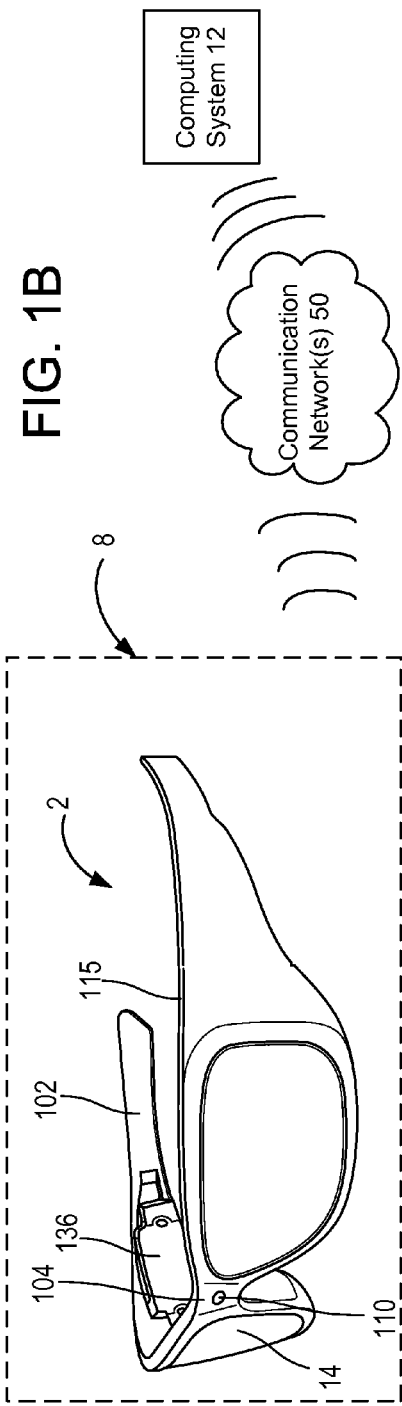

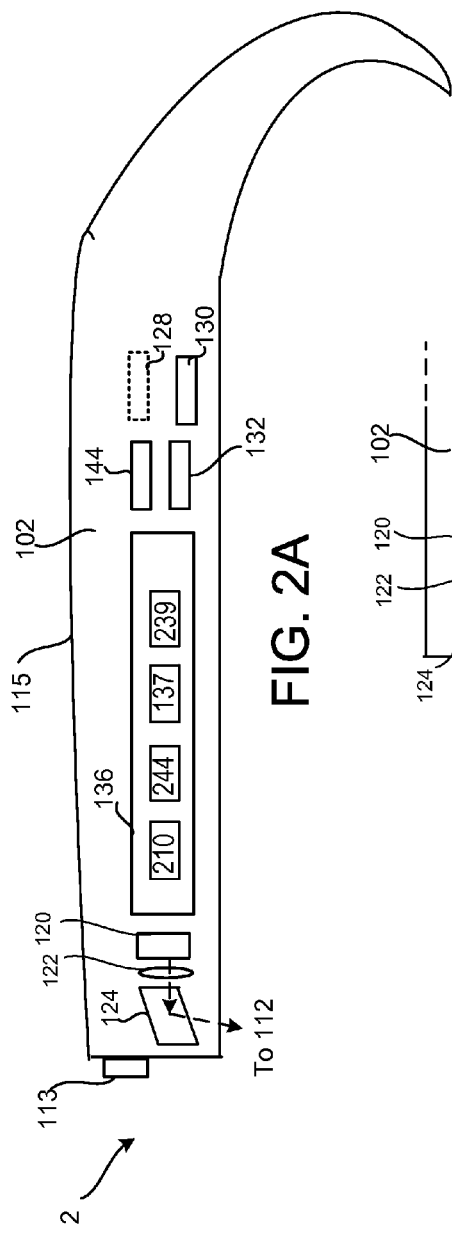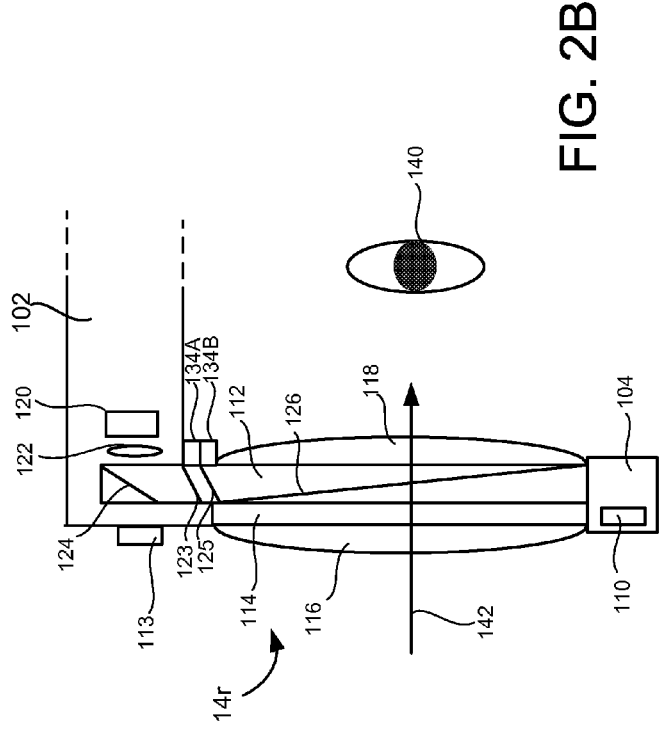

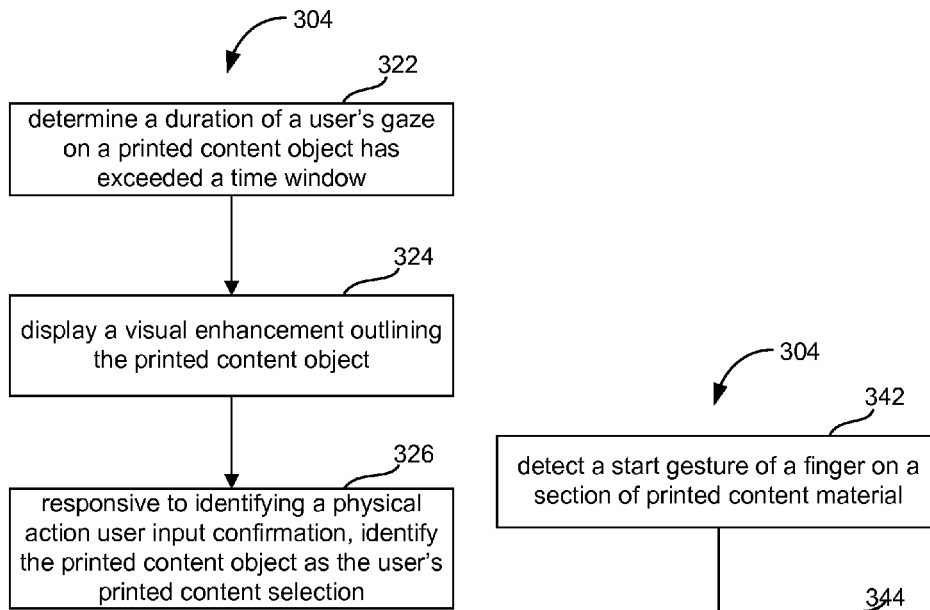
FIG. 7A
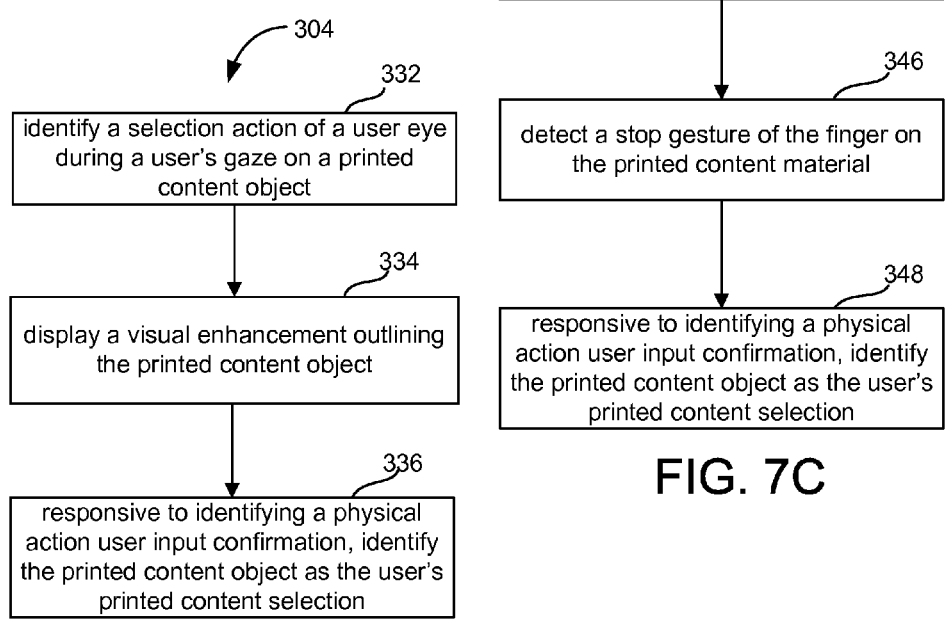
FIG. 7B
FIG. 7C

UPDATING PRINTED CONTENT WITH PERSONALIZED VIRTUAL DATA

CROSS REFERENCE TO RELATED PATENT APPLICATIONS

This application claims priority as a continuation-in-part to U.S. patent application Ser. No. 13/313,368 entitled "Making Static Printed Content Dynamic with Virtual Data," having the same inventors and filed Dec. 7, 2011, which is hereby incorporated by reference.

BACKGROUND

Static printed material may be thought of as a form of read only memory which requires no power and stores its data in a form visible to the human eye. Additionally, the data is presented generally in a format comfortable for human eye reading which presents printed text against a contrasting physical background of white or another contrasting colored paper. Furthermore, a large amount of information can be stored in printed material such as a textbook. However, the permanent setting of literary content on cards, books, magazines and other printed mediums for expressing literary content also means the content does not adapt to the reader.

SUMMARY

Mixed reality is a technology that allows virtual imagery to be mixed with a real world view. A see-through, near-eye, mixed reality display device may be worn by a user to view the mixed imagery of real objects and virtual objects displayed in the user's field of view. A near-eye display device such as a head mounted display (HMD) device can update the data embodied in the static printed material. In other words, the physical book, magazine or other embodiment of static printed material becomes a form of memory which is dynamic in the sense that what appears on a printed sheet of paper, a printed card or other printed medium can change, and can change based on user profile data.

The technology provides an embodiment of a method for updating printed content with personalized virtual data using a see-through, near-eye, mixed reality display device. The method comprises identifying a printed content item in a field of view of a see-through, near-eye, mixed reality display device and identifying user selection of a printed content selection within the printed content item based on physical action user input. Some examples of a printed content item are a book or magazine. Some examples of a printed content selection is a word, phrase, illustration, or paragraph. Some examples of physical action user input are a gesture, eye gaze, and a sound or speech generated by a user.

Whether virtual data is available for the printed content selection is determined, and responsive to virtual data being available for the printed content selection, virtual data is selected from the available data based on user profile data. The virtual data is displayed in a position registered to a position of the printed content selection. Virtual data is image data of a virtual object and may be two-dimensional (2D) or three-dimensional (3D). A virtual object or virtual data which is registered to a real object like the printed content selection means the virtual object tracks its position in a field of view of the see-through display device in reference to or dependent upon a position of the printed content selection seen through the see-through display device.

The technology provides an embodiment of a system for a see-through, near-eye, mixed reality display device system for updating printed content with personalized virtual data. The system comprises a see-through display positioned by a support structure. An example of a support structure is an eyeglasses frame. At least one outward facing camera is positioned on the support structure for capturing image data of a field of view of the see-through display. One or more software controlled processors have access to stored user profile data and are communicatively coupled to a search engine having access to one or more datastores including content, layout and virtual data for works and printed content items embodying the works.

The one or more software controlled processors are communicatively coupled to the at least one outward facing camera for receiving image data of the field of view. Based on the image data of the field of view, the one or more software controlled processors identify user physical action selecting a printed content selection in a printed content item. The one or more software controlled processors select virtual data from the one or more datastores based on user profile data and the printed content selection, and are communicatively coupled to at least one image generation unit for the see-through display to cause the unit to display the virtual data.

The technology provides an embodiment of one or more processor readable storage devices having instructions encoded thereon which instructions cause one or more processors to execute a method for updating printed content with personalized virtual data using a see-through, near-eye, mixed reality display device. The method comprises identifying a printed content item in a field of view of a see-through, near-eye, mixed reality display device and a task is determined which task is related to the printed content item based on physical action user input. The task is performed and personalized virtual data is displayed registered to the content item in accordance with the task.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1A is a block diagram depicting example components of one embodiment of a see-through, mixed reality display device system.

FIG. 1B is a block diagram depicting example components of another embodiment of a see-through, mixed reality display device system.

FIG. 2A is a side view of an eyeglass temple of a frame in an embodiment of the see-through, mixed reality display device embodied as eyeglasses providing support for hardware and software components.

FIG. 2B is a top view of an embodiment of a display optical system of a see-through, near-eye, mixed reality device.

FIG. 7A is a flowchart of an implementation example of a process for identifying at least one physical action of a user's eye selecting a printed content selection.

FIG. 7B is a flowchart of another implementation example of a process for identifying at least one physical action of a user's eye selecting a printed content selection.

FIG. 7C is a flowchart of an implementation example of a process for identifying at least one physical action of a gesture selecting a printed content selection.

DETAILED DESCRIPTION

Figure 1C:
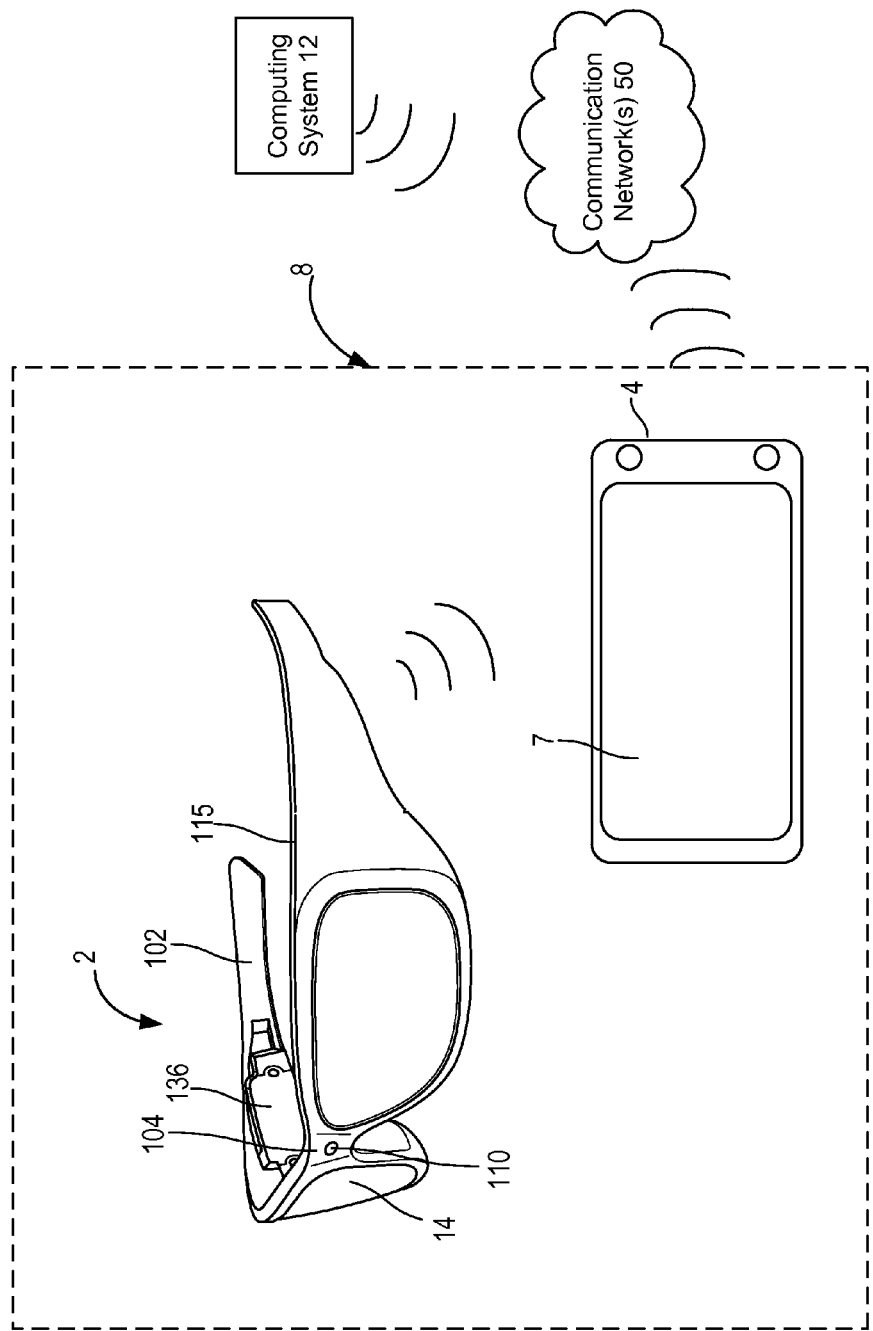
FIG. 1C is a block diagram depicting example components of another embodiment of a see-through, mixed reality display device system using a mobile device as a processing unit.

The technology provides various embodiments for updating static printed content with virtual data based on user profile data and displayed by a see-through, near-eye, mixed reality display device system. The see-through display device system identifies a real book, magazine, newspaper or other real printed material in a user field of view. A book, magazine, newspaper, a card or a separate sheet of paper are all examples of a printed content item which object recognition software can identify from image data captured by front facing cameras positioned on the display device system to capture objects in the field of view of the display device which approximates the user field of view when looking through the display device.

In some instances, eye gaze data identifies where a user is focusing in the field of view, and can thus identify at which portion of the printed content item a user is looking. A gaze duration on a portion of the printed material can identify the portion as a printed content selection. Gaze duration is an example of a physical action of a user using a body part. A gesture performed by a user body part such as a hand or finger and captured in image data is also an example of physical action user input. A blink or blinking sequence of an eye can also be a gesture. A pointing or particular movement gesture by a hand, finger or other body part can also indicate a printed content selection like a word, sentence, paragraph or photograph. A user generated sound command such as a voice command may also be considered an example of a physical action indicating user input. Sound based actions typically accompany other physical actions like a gesture and eye gaze.

Once the user selects a printed content item or a printed content selection like a picture or text within an item, associated 2D or 3D virtual data selected based on user profile data such as videos, images, text and holograms, can be registered to the selection or a section of the item. Additionally, different tasks or applications can be executed with respect to the printed content selection or content item which display personalized virtual data in accordance with the tasks. Some examples of such tasks which display personalized virtual data are described below and include examples from a learning assistance task, a directions task, and a task which allows a user to substitute or fill-in one or more words like names of a character or a location.

FIG. 1A is a block diagram depicting example components of an embodiment of a see-through, augmented or mixed reality display device system. System 8 includes a see-through display device as a near-eye, head mounted display device 2 in communication with a processing unit 4 via a wire 6 in this example or wirelessly in other examples. In this embodiment, head mounted, display device 2 is in the shape of eyeglasses in a frame 115, with a display optical system 14 for each eye in which image data is projected into a user's eye to generate a display of the image data while a user also sees through the display optical systems 14 for an actual direct view of the real world.

The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Each display optical system 14 is also referred to as a see-through display, and the two display optical systems 14 together may also be referred to as a see-through display.

Frame 115 provides a support structure for holding elements of the system in place as well as a conduit for electrical connections. In this embodiment, frame 115 provides a convenient eyeglass frame as support for the elements of the system discussed further below. The frame 115 includes a nose bridge portion 104 with a microphone 110 for recording sounds and transmitting audio data in this embodiment. A temple or side arm 102 of the frame rests on each of a user's ears. In this example, the right temple 102r includes control circuitry 136 for the display device 2.

As illustrated in FIGS. 2A and 2B, an image generation unit 120 is included on each temple 102 in this embodiment as well. Also, not shown in this view, but illustrated in FIGS. 2A and 2B are outward facing cameras 113 for recording digital images and videos and transmitting the visual recordings to the control circuitry 136 which may in turn send the captured image data to the processing unit 4 which may also send the data to one or more computer systems 12 over a network 50.

The processing unit 4 may take various embodiments. In some embodiments, processing unit 4 is a separate unit which may be worn on the user's body, e.g. a wrist, or be a separate device like the illustrated mobile device 4 as illustrated in FIG. 1C. The processing unit 4 may communicate wired or wirelessly (e.g., WiFi, Bluetooth, infrared, RFID transmission, wireless Universal Serial Bus (WUSB), cellular, 3G, 4G or other wireless communication means) over a communication network 50 to one or more computing systems 12 whether located nearby or at a remote location. In other embodiments, the functionality of the processing unit 4 may be integrated in software and hardware components of the display device 2 as in FIG. 1B.

Figure 17:
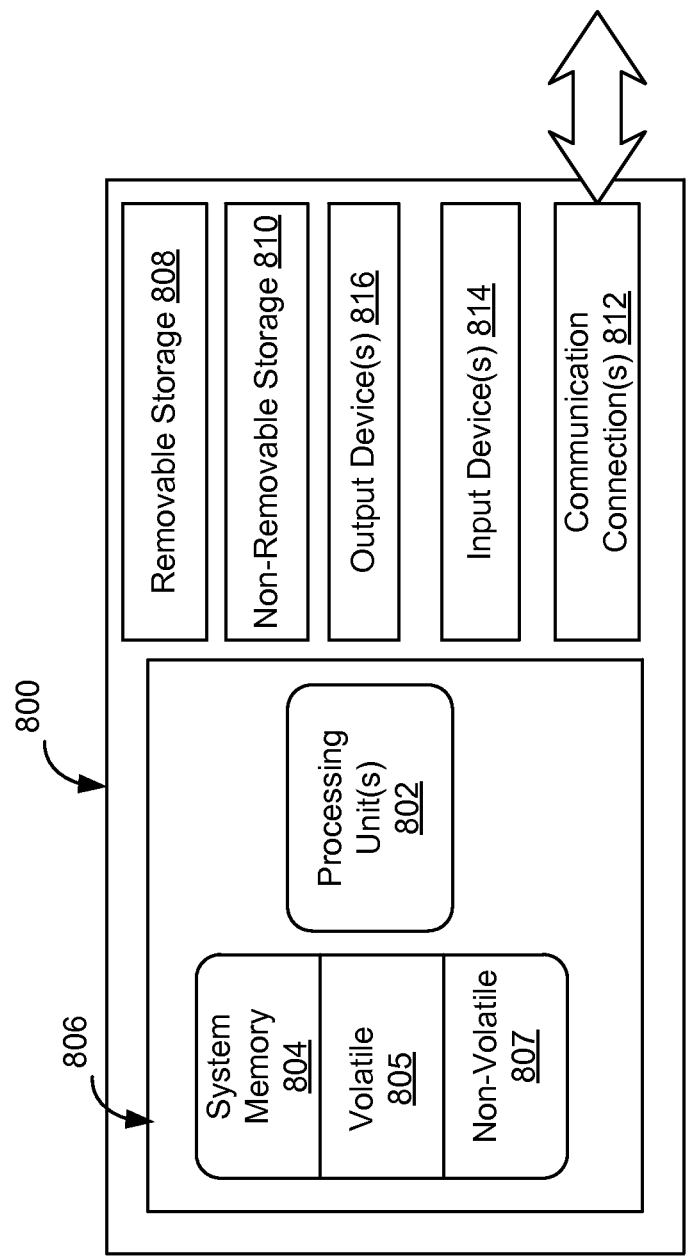
FIG. 17 is a block diagram of one embodiment of a computing system that can be used to implement a network accessible computing system.

A remote, network accessible computer system 12 may be leveraged for processing power and remote data access. An application may be executing on computing system 12 which interacts with or performs processing for display system 8, or may be executing on one or more processors in the see-through, mixed reality display system 8. An example of hardware components of a computing system 12 is shown in FIG. 17.

FIG. 1B is a block diagram depicting example components of another embodiment of a see-through, augmented or mixed reality display device system 8 which may communicate over a communication network 50 with other devices. In this embodiment, the control circuitry 136 of the display device 2 communicates wirelessly via a wireless transceiver (see 137 in FIG. 2A) over a communication network 50 to one or more computer systems 12.

FIG. 1C is a block diagram of another embodiment of a see-through, mixed reality display device system using a mobile device as a processing unit 4. Examples of hardware and software components of a mobile device 4 such as may be embodied in a smartphone or tablet computing device are described in FIG. 18. A display 7 of the mobile device 4 may also display data, for example menus, for executing applications and be touch sensitive for accepting user input. Some other examples of mobile devices 4 are a smartphone, a laptop or notebook computer, and a netbook computer.

FIG. 2A is a side view of an eyeglass temple 102 of the frame 115 in an embodiment of the see-through, mixed reality display device 2 embodied as eyeglasses providing support for hardware and software components. At the front of frame 115 is physical environment facing video camera 113 that can capture video and still images of the real world to map real objects in the field of view of the see-through display, and hence, in the field of view of the user. The cameras are also referred to as outward facing cameras meaning facing outward from the user's head. Each front facing camera 113 is calibrated with respect to a reference point of its respective display optical system 14 such that the field of view of the display optical system 14 can be determined from the image data captured by the respective camera 113. One example of such a reference point is an optical axis (see 142 in FIG. 2B) of its respective display optical system 14. he image data is typically color image data.

In many embodiments, the two cameras 113 provide overlapping image data from which depth information for objects in the scene may be determined based on stereopsis. In some examples, the cameras may also be depth sensitive cameras which transmit and detect infrared light from which depth data may be determined. The processing identifies and maps the user's real world field of view. Some examples of depth sensing technologies that may be included on the head mounted display device 2 without limitation, are SONAR, LIDAR, Structured Light, and/or Time of Flight.

Control circuits 136 provide various electronics that support the other components of head mounted display device 2. In this example, the right temple 102r includes control circuitry 136 for the display device 2 which includes a processing unit 210, a memory 244 accessible to the processing unit 210 for storing processor readable instructions and data, a wireless interface 137 communicatively coupled to the processing unit 210, and a power supply 239 providing power for the components of the control circuitry 136 and the other components of the display 2 like the cameras 113, the microphone 110 and the sensor units discussed below. The processing unit 210 may comprise one or more processors including a central processing unit (CPU) and a graphics processing unit (GPU).

Inside, or mounted to temple 102, are ear phones 130, inertial sensors 132, one or more location or proximity sensors 144, some examples of which are a GPS transceiver, an infrared (IR) transceiver, or a radio frequency transceiver for processing RFID data. Optional electrical impulse sensor 128 detects commands via eye movements. In one embodiment, inertial sensors 132 include a three axis magnetometer 132A, three axis gyro 132B and three axis accelerometer 132C. The inertial sensors are for sensing position, orientation, and sudden accelerations of head mounted display device 2. From these movements, head position may also be determined. In this embodiment, each of the devices using an analog signal in its operation like the sensor devices 144, 128, 130, and 132 as well as the microphone 110 and an IR illuminator 134A discussed below, include control circuitry which interfaces with the digital processing unit 210 and memory 244 and which produces and converts analog signals for its respective device.

Mounted to or inside temple 102 is an image source or image generation unit 120 which produces visible light representing images. In one embodiment, the image source includes micro display 120 for projecting images of one or more virtual objects and coupling optics lens system 122 for directing images from micro display 120 to reflecting surface or element 124. The microdisplay 120 may be implemented in various technologies including transmissive projection technology, micro organic light emitting diode (OLED) technology, or a reflective technology like digital light processing (DLP), liquid crystal on silicon (LCOS) and Mirasol® display technology from Qualcomm, Inc. The reflecting surface 124 directs the light from the micro display 120 into a lightguide optical element 112, which directs the light representing the image into the user's eye. Image data of a virtual object may be registered to a real object meaning the virtual object tracks its position to a position of the real object seen through the see-through display device 2 when the real object is in the field of view of the see-through displays 14.

In some embodiments, one or more printed content selections being tracked for augmentation may be printed with one or more markers to improve detection of a content selection. Markers may also include metadata describing the content selection. For example, a photograph in a magazine may be printed with IR retroreflective markers or RFID tags which include the identifiers for the people in the photograph, as well as the place, date and time of day at which it was taken. Additionally, an identifier of one or more printed or electronic versions of a work in which it has been printed may be included. An IR or RFID unit 144 may detect the marker and send the data it contains to the control circuitry 136.

FIG. 2B is a top view of an embodiment of one side of a see-through, near-eye, mixed reality display device including a display optical system 14. A portion of the frame 115 of the near-eye display device 2 will surround a display optical system 14 for providing support and making electrical connections. In order to show the components of the display optical system 14, in this case 14r for the right eye system, in the head mounted display device 2, a portion of the frame 115 surrounding the display optical system is not depicted.

In the illustrated embodiment, the display optical system 14 is an integrated eye tracking and display system. The system includes a light guide optical element 112, opacity filter 114, and optional see-through lens 116 and see-through lens 118. The opacity filter 114 for enhancing contrast of virtual imagery is behind and aligned with optional see-through lens 116, lightguide optical element 112 for projecting image data from the microdisplay 120 is behind and aligned with opacity filter 114, and optional see-through lens 118 is behind and aligned with lightguide optical element 112. More details of the light guide optical element 112 and opacity filter 114 are provided below.

Light guide optical element 112 transmits light from micro display 120 to the eye 140 of the user wearing head mounted, display device 2. Light guide optical element 112 also allows light from in front of the head mounted, display device 2 to be transmitted through light guide optical element 112 to eye 140, as depicted by arrow 142 representing an optical axis of the display optical system 14r, thereby allowing the user to have an actual direct view of the space in front of head mounted, display device 2 in addition to receiving a virtual image from micro display 120. Thus, the walls of light guide optical element 112 are see-through. Light guide optical element 112 includes a first reflecting surface 124 (e.g., a mirror or other surface). Light from micro display 120 passes through lens 122 and becomes incident on reflecting surface 124. The reflecting surface 124 reflects the incident light from the micro display 120 such that light is trapped inside a waveguide, a planar waveguide in this embodiment. A representative reflecting element 126 represents the one or more optical elements like mirrors, gratings, and other optical elements which direct visible light representing an image from the planar waveguide towards the user eye 140.

Infrared illumination and reflections, also traverse the planar waveguide 112 for an eye tracking system 134 for tracking the position of the user's eyes. The position of the user's eyes and image data of the eye in general may be used for applications such as gaze detection, blink command detection and gathering biometric information indicating a personal state of being for the user. The eye tracking system 134 comprises an eye tracking illumination source 134A and an eye tracking IR sensor 134B positioned between lens 118 and temple 102 in this example. In one embodiment, the eye tracking illumination source 134A may include one or more infrared (IR) emitters such as an infrared light emitting diode (LED) or a laser (e.g. VCSEL) emitting about a predetermined IR wavelength or a range of wavelengths. In some embodiments, the eye tracking sensor 134B may be an IR camera or an IR position sensitive detector (PSD) for tracking glint positions.

The use of a planar waveguide as a light guide optical element 112 in this embodiment allows flexibility in the placement of entry and exit optical couplings to and from the waveguide's optical path for the image generation unit 120, the illumination source 134A and the IR sensor 134B. In this embodiment, a wavelength selective filter 123 passes through visible spectrum light from the reflecting surface 124 and directs the infrared wavelength illumination from the eye tracking illumination source 134A into the planar waveguide 112 through wavelength selective filter 125 passes through the visible illumination from the micro display 120 and the IR illumination from source 134A in the optical path heading in the direction of the nose bridge 104. Reflective element 126 in this example is also representative of one or more optical elements which implement bidirectional infrared filtering which directs IR illumination towards the eye 140, preferably centered about the optical axis 142 and receives IR reflections from the user eye 140. Besides gratings and such mentioned above, one or more hot mirrors may be used to implement the infrared filtering. In this example, the IR sensor 134B is also optically coupled to the wavelength selective filter 125 which directs only infrared radiation from the waveguide including infrared reflections of the user eye 140, preferably including reflections captured about the optical axis 142, out of the waveguide 112 to the IR sensor 134B.

In other embodiments, the eye tracking unit optics are not integrated with the display optics. For more examples of eye tracking systems for HMD devices, see U.S. Pat. No. 7,401,920, entitled "Head Mounted Eye Tracking and Display System", issued Jul. 22, 2008 to Kranz et al., see U.S. patent application Ser. No. 13/221,739, Lewis et al., entitled "Gaze Detection in a See-Through, Near-Eye, Mixed Reality Display," filed Aug. 30, 2011, and see U.S. patent application Ser. No. 13/245,700, Bohn, entitled "Integrated Eye Tracking and Display System," filed Sep. 26, 2011, all of which are incorporated herein by reference.

Another embodiment for tracking the direction of the eyes is based on charge tracking. This concept is based on the observation that a retina carries a measurable positive charge and the cornea has a negative charge. Sensors 128, in some embodiments, are mounted by the user's ears (near earphones 130) to detect the electrical potential while the eyes move around and effectively read out what the eyes are doing in real time. (See *Control your mobile music with eyeball-activated earphones!*, Feb. 19, 2010 http://www.wirefresh.com/control-your-mobile-music-with-eyeball-actvated-headphones, which is hereby incorporated by reference.) Eye blinks may be tracked as commands. Other embodiments for tracking eyes movements such as blinks which are based on pattern and motion recognition in image data from the small eye tracking camera 134B mounted on the inside of the glasses, can also be used. The eye tracking camera 134B sends buffers of image data to the memory 244 under control of the control circuitry 136.

Opacity filter 114, which is aligned with light guide optical element 112, selectively blocks natural light from passing through light guide optical element 112 for enhancing contrast of virtual imagery. When the system renders a scene for the mixed reality display, it takes note of which real-world objects are in front of which virtual objects and vice versa. If a virtual object is in front of a real-world object, then the opacity is turned on for the coverage area of the virtual object. If the virtual object is (virtually) behind a real-world object, then the opacity is turned off, as well as any color for that display area, so the user will only see the real-world object for that corresponding area of real light. The opacity filter assists the image of a virtual object to appear more realistic and represent a full range of colors and intensities. In this embodiment, electrical control circuitry for the opacity filter, not shown, receives instructions from the control circuitry 136 via electrical connections routed through the frame.

Again, FIGS. 2A and 2B only show half of the head mounted display device 2. A full head mounted display device would include another set of optional see-through lenses 116 and 118, another opacity filter 114, another light guide optical element 112, another micro display 120, another lens system 122 physical environment facing camera 113 (also referred to as outward facing or front facing camera 113), eye tracking assembly 134, earphones 130, and sensors 128 if present. Additional details of a head mounted display 2 are illustrated in U.S. patent application Ser. No. 12/905,952 entitled Fusing Virtual Content Into Real Content, Filed Oct. 15, 2010, fully incorporated herein by reference.

Figure 3:
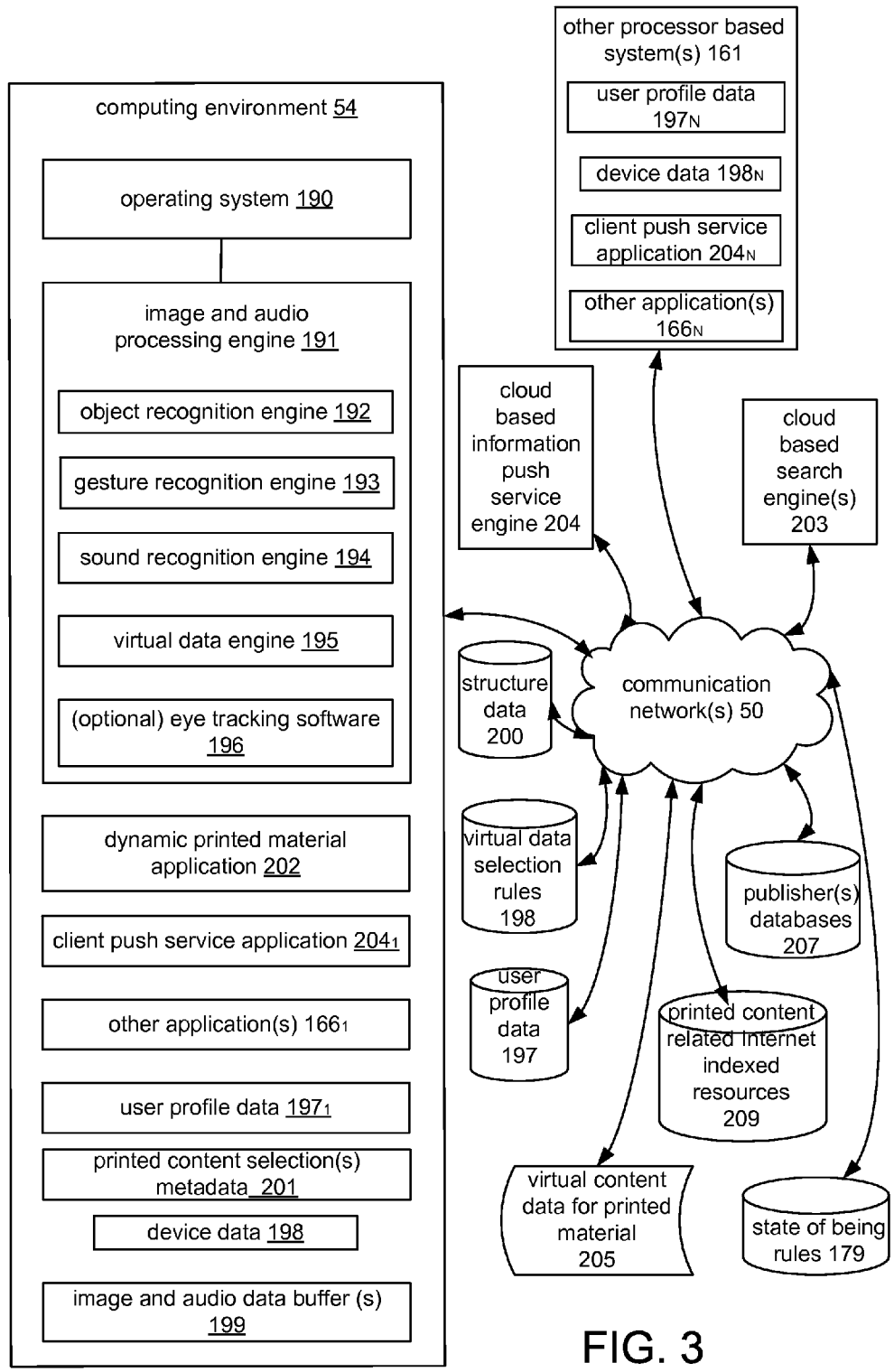
FIG. 3 is a block diagram of a system from a software perspective for providing a mixed reality user interface by a see-through, mixed reality display device system in which software for updating printed content with personalized virtual data can operate.

FIG. 3 illustrates a computing environment embodiment from a software perspective which may be implemented by the display device system 8, a remote computing system 12 in communication with the display device system or both. Network connectivity allows leveraging of available computing resources. The computing environment 54 may be implemented using one or more computer systems. As shown in the embodiment of FIG. 3, the software components of a computing environment 54 include an image and audio processing engine 191 in communication with an operating system 190. Image and audio processing engine 191 includes object recognition engine 192, gesture recognition engine 193, sound recognition engine 194, virtual data engine 195, and, optionally eye tracking software 196 if eye tracking is in use, all in communication with each other. Image and audio processing engine 191 processes video, image, and audio data received from a capture device such as the outward facing cameras 113. To assist in the detection and/or tracking of objects, an object recognition engine 192 of the image and audio processing engine 191 may access one or more databases of structure data 200 over one or more communication networks 50.

Virtual data engine 195 processes virtual objects and registers the position and orientation of virtual objects in relation to one or more coordinate systems. Additionally, the virtual data engine 195 performs the translation, rotation, scaling and perspective operations using standard image processing methods to make the virtual object appear realistic. A virtual object position may be registered or dependent on a position of a corresponding real object. The virtual data engine 195 determines the position of image data of a virtual object in display coordinates for each display optical system 14. The virtual data engine 195 may also determine the position of virtual objects in various maps of a real-world environment stored in a memory unit of the display device system 8 or of the computing system 12. One map may be the field of view of the display device with respect to one or more reference points for approximating the locations of the user's eyes. For example, the optical axes of the see-through display optical systems 14 may be used as such reference points. In other examples, the real-world environment map may be independent of the display device, e.g. a 3D map or model of a location (e.g. store, coffee shop, museum).

One or more processors of the computing system 12, or the display device system 8 or both also execute the object recognition engine 192 to identify real objects in image data captured by the environment facing cameras 113. As in other image processing applications, a person can be a type of object. For example, the object recognition engine 192 may implement pattern recognition based on structure data 200 to detect particular objects including a human. The object recognition engine 192 may also include facial recognition software which is used to detect the face of a particular person.

Structure data 200 may include structural information about targets and/or objects to be tracked. For example, a skeletal model of a human may be stored to help recognize body parts. In another example, structure data 200 may include structural information regarding one or more inanimate objects in order to help recognize the one or more inanimate objects. The structure data 200 may store structural information as image data or use image data as references for pattern recognition. The image data may also be used for facial recognition. As printed material typically includes text, the structure data 200 may include one or more image datastores including images of numbers, symbols (e.g. mathematical symbols), letters and characters from alphabets used by different languages. Additionally, structure data 200 may include handwriting samples of the user for identification. Based on the image data, the dynamic printed material application 202 can convert the image data to a computer standardized data format for text with a smaller memory footprint. Some examples of computer standardized text data formats are Unicode based on the Universal Character Set (UCS) and the American Standard Code for Information Interchange (ASCII) format. The text data can then be searched against databases for identification of the content including the text or for related information about the content of the text.

Upon detection of one or more objects by the object recognition engine 192, image and audio processing engine 191 may report to operating system 190 an identification of each object detected and a corresponding position and/or orientation which the operating system 190 passes along to an application like dynamic printed material application 202.

The sound recognition engine 194 processes audio received via microphone 110.

The outward facing cameras 113 in conjunction with the gesture recognition engine 193 implements a natural user interface (NUI) in embodiments of the display device system 8. Blink commands or gaze duration data identified by the eye tracking software 196 are also examples of physical action user input. Voice commands may also supplement other recognized physical actions such as gestures and eye gaze.

The gesture recognition engine 193 can identify actions performed by a user indicating a control or command to an executing application. The action may be performed by a body part of a user, e.g. a hand or finger typically in reading applications, but also an eye blink sequence of an eye can be gestures. In one embodiment, the gesture recognition engine 193 includes a collection of gesture filters, each comprising information concerning a gesture that may be performed by at least a part of a skeletal model. The gesture recognition engine 193 compares a skeletal model and movements associated with it derived from the captured image data to the gesture filters in a gesture library to identify when a user (as represented by the skeletal model) has performed one or more gestures. In some examples, a camera, in particular a depth camera in the real environment separate from the display device 2 in communication with the display device system 8 or a computing system 12 may detect the gesture and forward a notification to the system 8, 12. In other examples, the gesture may be performed in view of the cameras 113 by a body part such as the user's hand or one or more fingers.

In some examples, matching of image data to image models of a user's hand or finger during gesture training sessions may be used rather than skeletal tracking for recognizing gestures.

More information about the detection and tracking of objects can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety. More information about the gesture recognition engine 193 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool," filed on May 29, 2009, both of which are incorporated by reference herein in their entirety.

The computing environment 54 also stores data in image and audio data buffer(s) 199. The buffers provide memory for receiving image data captured from the outward facing cameras 113, image data from an eye tracking camera of an eye tracking assembly 134 if used, buffers for holding image data of virtual objects to be displayed by the image generation units 120, and buffers for audio data such as voice commands from the user via microphone 110 and instructions to be sent to the user via earphones 130.

Device data 198 may include a unique identifier for the computer system 8, a network address, e.g. an IP address, model number, configuration parameters such as devices installed, identification of the operation system, and what applications are available in the display device system 8 and are executing in the display system 8 etc. Particularly for the see-through, mixed reality display device system 8, the device data may also include data from sensors or determined from the sensors like the orientation sensors 132, the temperature sensor 138, the microphone 110, the electrical impulse sensor 128 if present, and the location and proximity transceivers 144.

In this embodiment, the display device system 8 and other processor based systems 161 used by the user execute a client side version of a push service application $204_N$ which communicates over a communication network 50 with an information push service engine 204. The information push service engine or application 204 is cloud based in this embodiment. A cloud based engine may include one or more software applications which execute on and store data by one or more networked computer systems. The engine is not tied to a particular location. Some examples of cloud based software are social networking sites and web-based email sites like Yahoo!® and Hotmail®. A user may register an account with the information push service engine 204 which grants the information push service permission to monitor the user's executing applications and data generated and received by them as well as user profile data 197, and device data 198 for tracking the user's location and device capabilities. Based on the user profile data aggregated from the user's systems 8, 161, the data received and sent by the executing applications on systems 8, 161 used by the user, and location and other sensor data stored in device data $198_1$, $198_N$, the information push service 204 can determine a physical context, a social context, a personal context like a state of being or a combination of contexts for the user.

The local copies of the user profile data $197_1$, $197_N$ may store some of the same user profile data 197 and the client side push service applications $204_1$ may periodically update their local copies with the user profile data stored by the computer system 12 in an accessible database 197 over a communication network 50. Some examples of user profile data 197 are the user's expressed preferences, the user's friends' list, the user's preferred activities, the user's favorites, some examples of which are, favorite color, favorite foods, favorite books, favorite author, etc., a list of the user's reminders, the user's social groups, the user's current location, and other user created content, such as the user's photos, images and recorded videos. In one embodiment, the user-specific information may be obtained from one or more data sources or applications such as the information push service 204, a user's social networking sites, contacts or address book, schedule data from a calendar application, email data, instant messaging data, user profiles or other sources on the Internet as well as data directly entered by the user. As discussed below, a state of being may be derived from eye data and be updated and stored in the user profile data 197 both locally and by the remote push service application 204. In this embodiment, a network accessible state of being rules 179 links identified eye data with a state of being as a reference for deriving the state of being.

Trust levels may be determined by user profile data 197 which identifies people known to the user, for example as social networking friends and family members sharing the same gaming service, which may be subdivided into different groups based on trust levels. Additionally, the user may explicitly identify trust levels in their user profile data 197 using a client side push service application $204_N$. In one embodiment, the cloud based information push service engine 204 aggregates data from user profile data $197_N$ stored on the different user computer systems 8, 161 of the user.

Each version of the push service application 204 also stores in user profile data 197 a tracking history of the user. Some examples of events, people and things tracked in the tracking history are locations visited, transactions, content and real things purchased, a reading history, a viewing history including viewings of television, movies, and videos, and people detected with whom the user has interacted. If electronically identified friends (e.g. social networking friends) are registered with the push service application 204 too, or they make information available to the user or publicly through other applications 166, the push service application 204 can use this data as well to track the content and social context of the user.

Figure 4A:
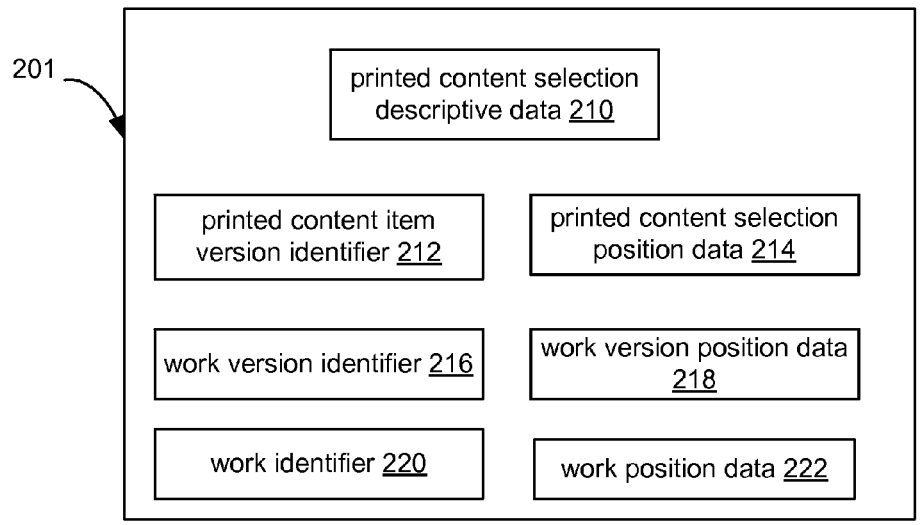
FIG. 4A illustrates an example of a printed content selection metadata record.

As discussed further below, the dynamic printed material application 202 may access one or more search engines 203 for accessing information for identifying a printed content selection and a printed content item including it as well as related virtual data 205. Examples of resources which may be searched for identification and pertinent virtual data are illustrated as publisher databases 207 and printed content related resources 209 indexed for Internet searching. For example, a general purpose search engine like Bing® or Google® may be accessed as well as a search engine for the Library of Congress, university libraries or publisher databases made available to the public or on a subscription basis as may be identified in user profile data. Publishers may have pointers to virtual content in their databases 207 as publishers may have a business model for encouraging virtual content to be developed for their print material. Additionally, entities not associated with the publishers or who wish to maintain their own data resources may wish to make virtual content available through their own websites which are Internet indexed resources. From searching on information derived from image data of the printed content selection and the printed content item containing it, data fields in metadata 201 for a printed content selection can be filled with values. FIG. 4A discussed below provides an example of a printed content selection metadata record.

One advantage of the technology is the ability to update previously published material which was printed without any plan for virtual augmentation. As discussed below, a user may be requested to view printed version identifying data on the printed content, for example a title page of a book or newspaper or a table of contents of a magazine. Other examples of version identifying data are standardized identifiers, an example of which is the International Standard Book Number (ISBN) for books. The ISBN number on the book identifies data such as a language group, publisher, title and edition or variation of the book. For periodicals, the International Standard Serial Number (ISSN) identifies the title of a periodical and a Serial Item and Contribution Identifier (SICI) is a standard used to identify specific volumes, articles or other identifiable parts of the periodical. For example, the ISSN may identify a periodical, for example the Journal of Head Mounted Displays and a SICI identifies an article by bibliographic items, some examples of which are title, volume and number, date of publication, beginning and ending pages and content format, e.g. TX for printed text. Other content formats may indicate web publication and audiovisual formats. The image data from the outward facing cameras or text converted from image data of the viewed identifying data is sent to one or more search engines 203.

Once the printed version of the work the user is looking at is identified and the printed content selection is located within it, the dynamic printed material application 202 can query one or more search engines 203 to search for virtual content data 205 for the printed content selection based on the printed content item including it. In some embodiments, the virtual content data is associated with a work or a work version including the content selection independent of the medium expressing the content. For example, paper or other printable material is an example of a medium. Another medium expressing a work is an electronic display or audio recording.

In some instances, the virtual data 205 is data specifically generated for appearing in relation to the content selection as laid out in a specific printed version, for example on a particular page of a book or other subdivision of printed material. For example, a museum may have a plurality of virtual content data selections available for a museum placard associated with an exhibit item based on an age and tracked reading and viewing history of a user indicating an interest in the subject. Image data for each virtual data selection may be specifically formatted to overlay the placard or just portions of the placard.

In other examples, virtual content 205 is tied to a medium independent work or work version. For example, a professor may store her notes she has made at different points in her printed copy of a textbook to be available for any version of the textbook independent of medium. In other words, the content of the textbook is a work. Current, previous and future versions of the textbook are versions of the work. The dynamic printed material application 202 links each note to a subdivision of the work in a medium independent organization of the work. For example, a note may be linked to a phrase in a particular paragraph which can be identified by executing software instructions for text matching. A paragraph is a medium independent subdivision while a page is dependent on the particular printing or electronic layout. A paperback copy of a textbook with smaller print is a different printed work version from a hardback copy of the textbook in larger print although they contain the exact same version of the textbook content. The professor may allow her virtual notes to be available for storage or streaming, at her discretion, to students who take her class or past students by granting permission and access to them.

FIG. 4A illustrates an example of a printed content selection metadata record which includes printed content selection descriptive data 210, a printed content item version identifier 212, printed content selection position data 214, a work version identifier 216 and work version position data 218 if applicable, a work identifier 220 and work position data 222. The work identifier 220 identifies the creative work independent of a particular format or medium. The work position data 222 identifies one or more locations of the printed content selection in terms of one or more medium independent subdivisions like paragraphs, stanzas, verses, etc. A work version identifier 216 may be included to describe different versions or editions of the work 210, for example translations, also independent of a particular format or medium. The work version position 218 may also be defined in terms of one or more medium independent subdivisions. The printed content item version identifier 212 identifies a particular printed edition of a particular printed layout. The printed version identifier 212 is tied to the medium of paper or other material which is physically printed. The printed content selection position data 214 may be in terms of a specific static printed layout location like a page or a position on a page.

For example, the poem "Beowulf" is a work. The original old English form of the poem is a work version, as would be a version which has substituted modern English terms for some of the words. Another example of a version would be a French translation. Another example would be the original old English poem footnoted with comments. A printed version identifier 212 may identify a printed version of the poem on one or more sheets of vellum maintained in a library. This printed version would also have the work version identifier for the original old English form and the work identifier for Beowulf associated with it. A different printed content item version identifier 212 identifies an anthology of English literature which has printed the version of Beowulf footnoted with comments beginning on its page 37. This different printed version has a different printed content item version identifier 212 and work version identifier than the original old English form of the poem, but has the same work identifier. For content within the anthology version of the poem selected by a user, the position data of the printed content selection is in terms of page 37. In this instance, likely, the work version position data 218 and the work position data 222 indicate the same stanza.

Figure 4B:
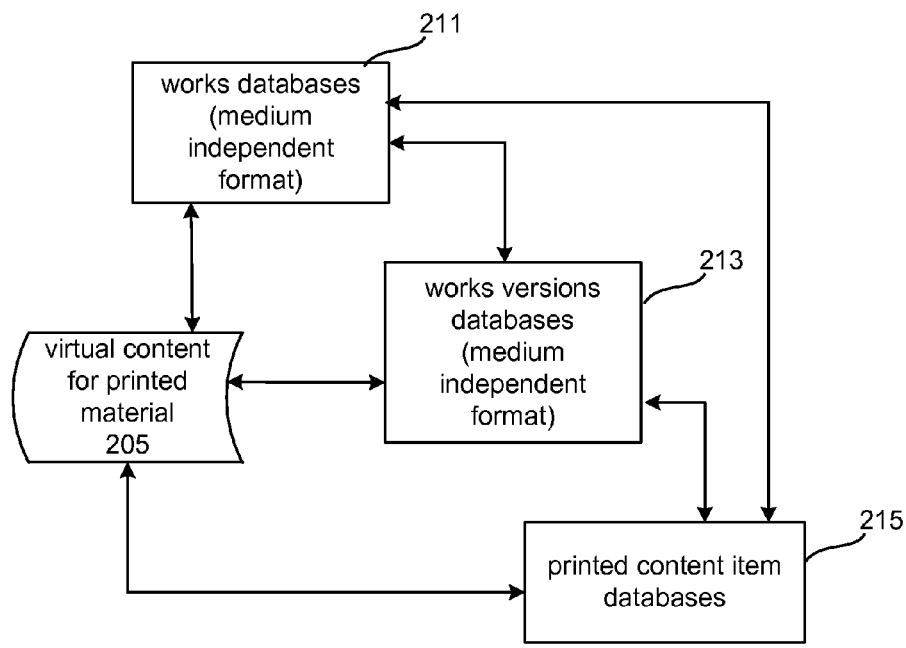
FIG. 4B illustrates examples of printed medium dependent and medium independent cross referencing content datastores.

FIG. 4B illustrates examples of printed medium dependent and medium independent content datastores, shown here as cross referencing databases. These databases 211, 213, 215 provide access to particular layouts including the content selection. The layouts may be medium independent and medium dependent. In this example, any of the printed content item version identifier 212, the work version identifier 216 or the work identifier 220 can be used to cross-reference or index into any of the medium independent works 211 and works versions databases 213 and the medium dependent or layout specific printed content item databases 215. The layouts or position data of a work, any work versions and the various printed content item versions of the work are crossed referenced as well. Again, some examples of medium independent subdivision identifiers may be paragraphs, stanza, verses or the like which provide a medium independent organization to the work or a work version. Paragraph 80 in a work can be cross-referenced to page 16 in one printed content item version and to page 24 in a larger print edition of the work in another printed content item version. Via the printed content item version identifier 212, a developer can link to the print layout of the print version, e.g. a particular edition, in the printed content items databases 215. Print layout includes things like page numbers, margin width, header and footer page content, font size, location of illustrations and photographs and their size on the page and other such layout specific information.

Publishers may provide access to their datastores of copyrighted works for identification purposes and as a reference for the layout of the work, work version or printed version for developers of virtual content. By being able to access the layout of the works, particular work versions and particular printed content item versions, developers can create virtual content 205 for medium independent and medium dependent versions of a work. As illustrated, the databases 211, 213 and 215 and the virtual content 205 may cross-reference each other.

For works not subject to copyright, datastores under control of libraries, particularly those with large collections like the Library of Congress, other national libraries, universities, and large public libraries, and book compilation websites like Google Books® and sites maintained by universities may be searched for copies of a work, a work version or a printed content version for layouts to which to reference position data 214, 218, 222.

Responsive to the available virtual data selections being identified, the dynamic printed material application 202 selects virtual data from the candidates of available virtual data selections based on virtual data selection rules 198 stored in accessible memory which can be local but which can also be network accessible. The virtual data selection rules 198 provide logic for identifying pertinent user data in user profile data 197 related to the content item or selection and the available candidates of virtual data.

Embodiments of methods for the technology and example implementation processes for some of the steps of the methods are presented in figures below. For illustrative purposes, the method embodiments below are described in the context of the system embodiments described above. However, the method embodiments are not limited to operating in the system embodiments described above and may be implemented in other system embodiments.

Figures 5A, 5B:
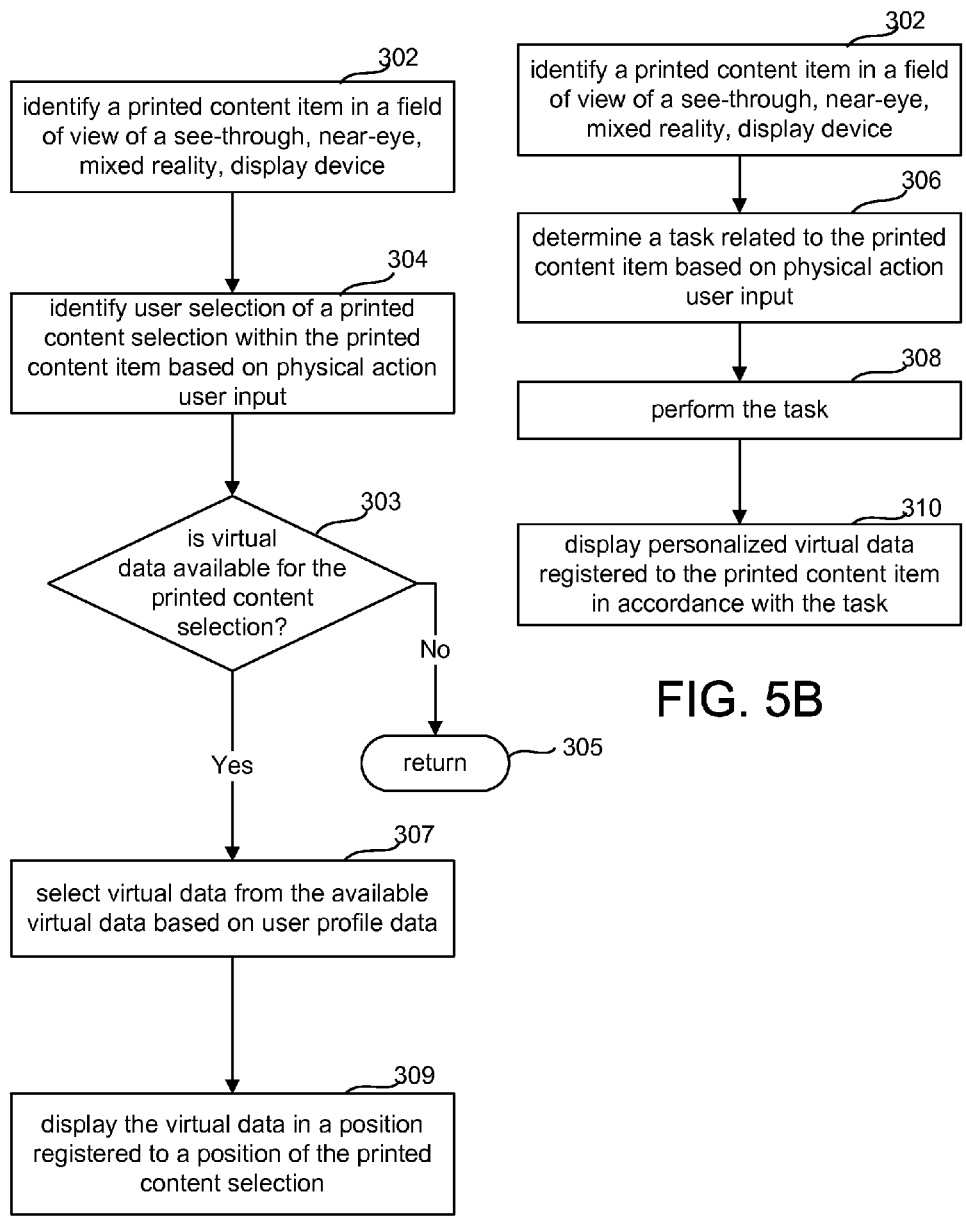
FIG. 5A is a flowchart of an embodiment of a method for updating printed content with personalized virtual data.
FIG. 5B is a flowchart of another embodiment of a method for updating printed content with personalized virtual data.

FIG. 5A is a flowchart of an embodiment of a method for updating printed content with personalized virtual data. The object recognition engine 192 may recognize an object as an item of printed material, e.g. a book or periodical or simply a sheet of paper, in a field of view of a see-through, mixed reality, display device, and the dynamic printed material application 202 is notified of the object recognition by the operating system 190. In step 302, the dynamic printed material application 202 identifies the printed content item and in step 304 identifies user selection of a printed content selection within the printed content item based on physical action user input. In step 303, the dynamic printed material application 202 determines whether virtual data is available for the printed content selection, and if not returns control in step 305 to another aspect of the dynamic printed material application 202 or another application executing in the display device system 8 until another printed content selection is identified.

If there is virtual data available for the printed content selection, then in step 307, the application 202 selects virtual data from the available virtual data based on user profile data, and causes display in step 309 of the virtual data in a position registered to a position of the printed content selection.

FIG. 5B is a flowchart of another embodiment of a method for updating printed content with personalized virtual data. Step 302 is performed as in FIG. 5A. In step 306, the dynamic printed material application 202 determines a task related to the printed content item based on physical action user input, and in step 308, performs the task. Personalized virtual data related to the printed content item is displayed in accordance with the task in step 310.

Some examples of tasks which display personalized virtual data are described below and include a learning assistance task, a directions task, and a task which allows a user to substitute or fill-in a name of a character or a location. As mentioned above, a user can define tasks as well.

Figure 6:
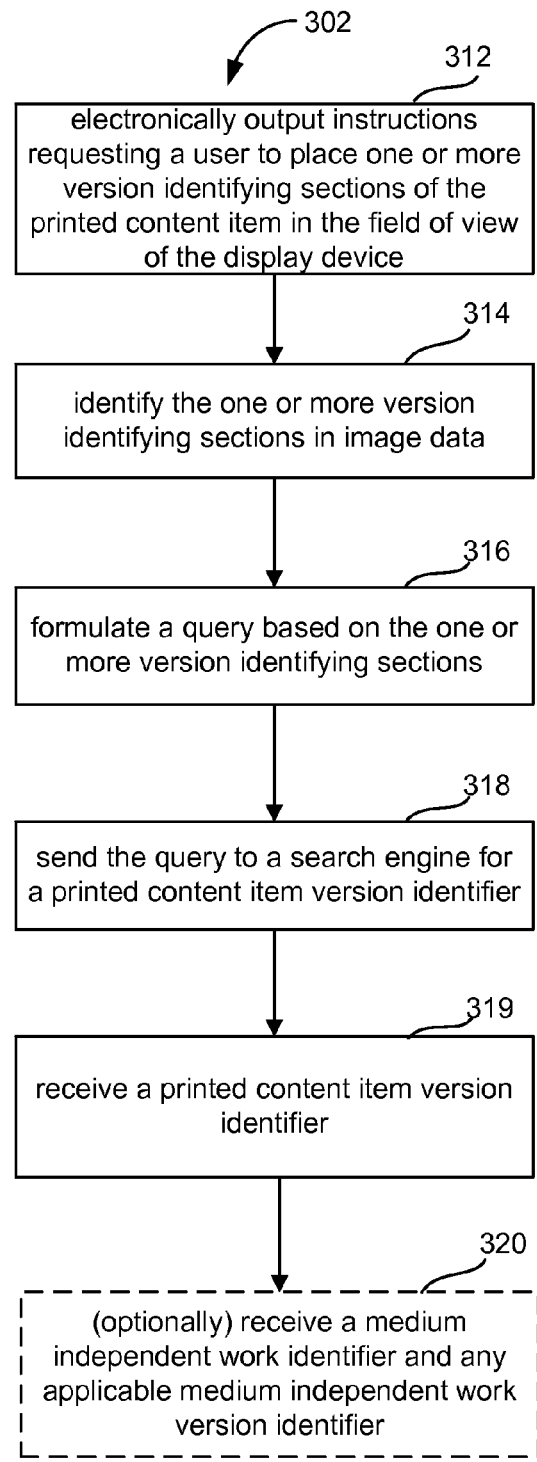
FIG. 6 is a flowchart of an embodiment of a process for identifying a printed content item in a field of view of a see-through, mixed reality display device.

FIG. 6 is a flowchart of an embodiment of a process for identifying a printed content item in a field of view of a see-through, mixed reality display device. In step 312, the dynamic printed material application 202 electronically outputs instructions requesting a user to place one or more version identifying sections of the printed content item in the field of view of the display device 2. Some examples of version identifying sections are the ISBN, ISSN and SICI numbers discussed above, a cover of a book or magazine, a title page, a front page, a table of contents, and a copyright page. The copyright page of a book often provides in a standardized format an ISBN number, the title, the print date, edition, author, publisher and information about earlier copyrights. The one or more version identifying sections may be identified in image data, for example based on templates for a copyright page or a template for the standardized number formats for ISBN, ISSN and SICI and data extracted and put into predetermined search fields like text, author, publisher, etc. In other examples, text on the page may be identified based on alphabet structure data 200 and converted to a computer standard text data format for a query.

In step 314, a query is formulated based on the one or more version identifying sections and sent in step 316 to a search engine for a printed content item version identifier. The dynamic printed material application 202 receives a printed content item version identifier in step 318. Optionally, in step 320, responsive to verifying the identity of the printed content item, the dynamic printed material application 202 receives a medium independent work identifier and any applicable medium independent work version identifier. The dynamic application 202 may also receive a work identifier and work version identifier by using the printed content item version identifier 212 as an index into publisher databases 207 or Internet indexed resources 209.

FIG. 7A is a flowchart of an implementation example of a process for identifying at least one physical action of a user's eye selecting a printed content selection. The eye tracking software 196 identifies a position of the eye in the socket typically based on pupil position, but iris position may also be a basis. In step 322, the dynamic printed material application 202 determines a duration of a user's gaze on a printed content object has exceeded a time window and, in step 324, causes the image generation units 120 to display a visual enhancement outlining the printed content object. In step 326, responsive to identifying a physical action user input confirmation, the dynamic printed material application 202 identifies the printed content object as the user's printed content selection. Some examples of a physical action user input confirmation are an action like a blink, gesture or voice command indicating "yes" or "select" or a request for a task. The user may indicate other than a confirmation by a physical action on the visual enhancement, e.g. an outline, like reshaping it to include more or less content, or a gesture, blink or voice command indicating "no" or "cancel."

FIG. 7B is a flowchart of another implementation example of a process for identifying at least one physical action of a user's eye selecting a printed content selection. In step 332, the dynamic printed material application 202 identifies a selection action of a user eye during a user's gaze on a printed content object, and in step 334, causes the image generation units 120 to display a visual enhancement outlining the printed content object. In step 336, responsive to identifying a physical action user input confirmation, the dynamic printed material application 202 identifies the printed content object as the user's printed content selection.

FIG. 7C is a flowchart of an embodiment of an implementation example of a process for identifying at least one physical action of a gesture selecting a printed content selection. In step 342, the dynamic printed material application 202 receives notification that a start gesture of a finger on a section, e.g. a page, of printed content material has been detected, and in step 344 causes the image generation units 120 to display a visual enhancement outlining the movement of the finger on the section of printed content material. In step 346, the dynamic printed material application 202 receives notification that a stop gesture of the finger on the printed content material has been detected. As fingers are typically on some portion of a page or sheet or card a user is reading, the start and stop gestures make a clear distinction of when a user is making a request as opposed to simply moving finger positions. Other process examples may not require a start and stop gesture and instead distinguish movements from gestures based on monitoring user finger behavior over time. In step 348, responsive to identifying a physical action user input confirmation, the dynamic printed material application 202 identifies the printed content object as the user's printed content selection.

Figure 8:
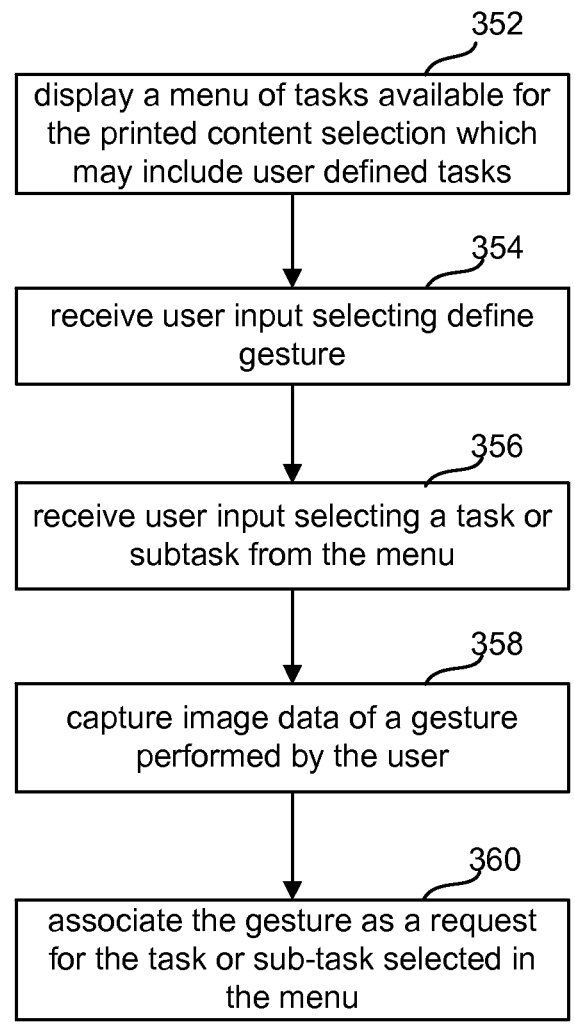
FIG. 8 is a flowchart of an implementation example of a process for generating and associating a user-defined gesture with a task.

FIG. 8 is a flowchart of an implementation example of a process for generating and associating a user-defined gesture with a task. The dynamic printed material application 202 in step 352 displays a menu of tasks available for the printed content selection which may include user defined tasks. An example of a user defined task would be a user selects content and performs a query for commentaries on the content. The user can save the specific search query, or save the search terms for criteria for commentaries as a task. When a user selects the commentaries task for a different content selection, commentaries for the different content selection are retrieved.

The dynamic printed material application 202 in step 354 receives user input selecting define gesture, and in step 356, receives user input selecting a task or subtask from the menu. The outward facing cameras 113 in step 358 capture image data of a gesture performed by the user of which the dynamic printed material application 202 is notified and in step 360, the dynamic printed material application 202 associates the gesture as a request for the task or sub-task selected in the menu.

Some printed material like books and periodicals may be printed with a layout including designated spots for virtual data. For example, next to a photograph with a marker with metadata identifying the photograph and related virtual content or data may be a space of predetermined dimensions where the related virtual data fits. The space may also have a marker, e.g. an RFID tag or an IR marker, identifying the virtual data to display there. However, even for content preprinted for augmentation by virtual data, a user may activate a task such as a search task and receive data for which the page has not been preformatted. The software executing in the computing environment 54 on the display device system 8, the remote computer system 12 or both determines where to place the virtual data. A user may also designate placement through physical action. For example, a user may gaze at virtual data for a duration and then gaze at a blank spot on a sheet or a page. In another example, a user may point to a virtual object with a finger and drag the finger to another spot on the sheet or page.

Figure 9:
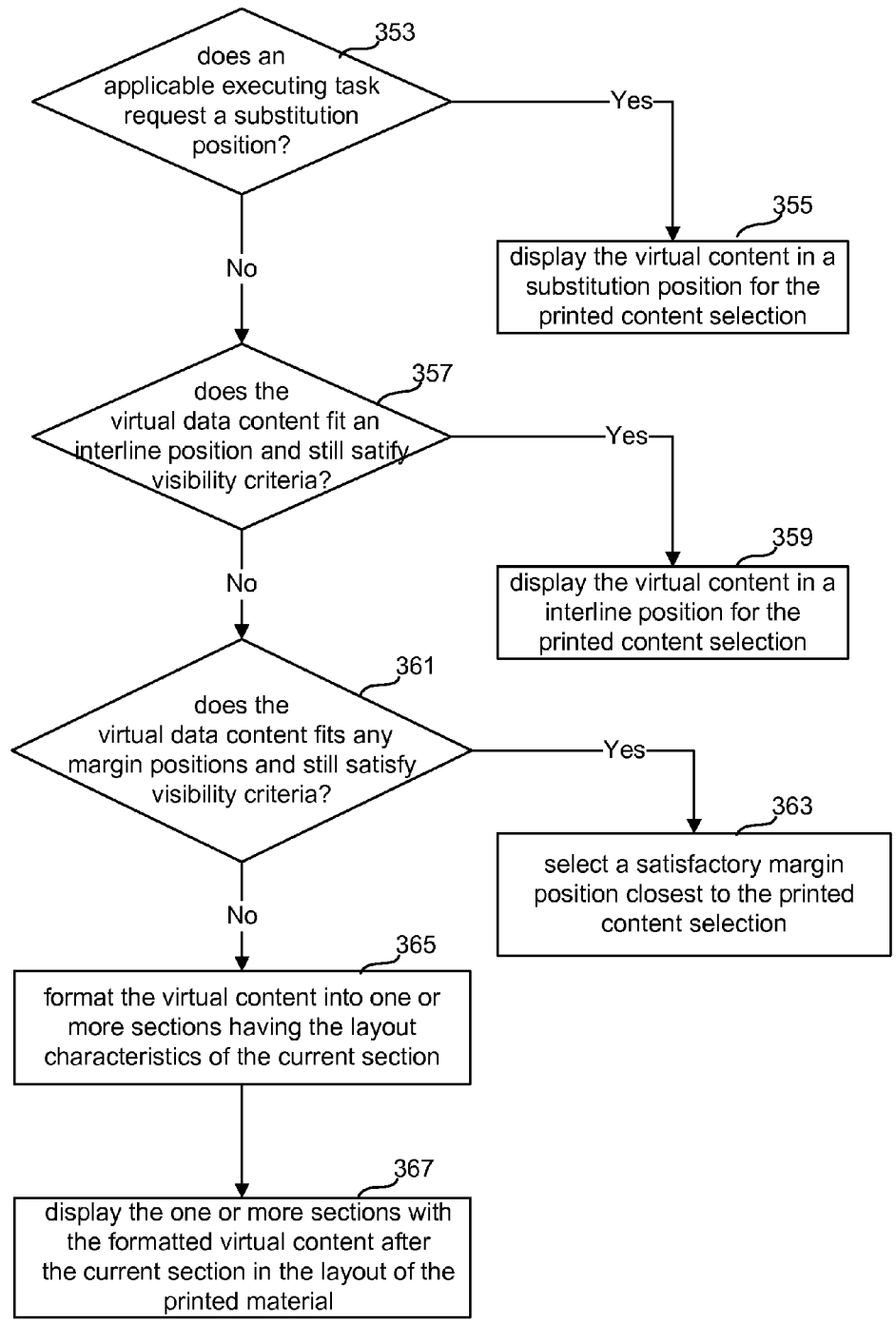
FIG. 9 is a flowchart of an implementation example of a process for determining placement of virtual data with respect to printed material.

FIG. 9 is a flowchart of an implementation example of a process for determining placement of virtual data with respect to printed material. In this example, the dynamic printed material application 202 has a number of predetermined position options in relation to the printed content selection from which to select. A user can move the virtual data as he or she prefers from the predetermined positions. In this example, in step 353, the dynamic printed material application 202 determines whether an applicable executing task requests a substitution position. For example, a task may be a personalization task with a sub-task of changing or inserting character names to those of the reader and one or more user designated people. If substitution intended, the dynamic application 202 displays the virtual content in a substitution position for the printed content selection in step 355. In step 357, responsive to an executing task not requesting a substitution position, the dynamic printed material application 202 determines whether the virtual data content fits an interline position and still satisfies visibility criteria. An interline position is a space between lines of text, or between a line of text and a picture, or a space between pictures. An example of visibility criteria is whether the size of the virtual content to fit the interline position would be too small for a human with average eyesight to read at a comfortable reading position. Whether the virtual data content fits an interline position can be determined based on what percentage of the content can be displayed at an interline position and still be visible. A synonym as a definition is an example of content which may fit an interline position and still satisfy visibility criteria. An interline position is typically not suitable for a picture. If an interline position is suitable, the dynamic application 202 displays the virtual content in an interline position for the printed content selection in step 359.

If the interline position is not suitable, in step 361, the dynamic application 202 determines whether the virtual data content fits any margin positions and still satisfies visibility criteria. If one or more satisfactory margin positions are available, the dynamic application 202 selects a satisfactory margin position closest to the printed content selection in step 363. If a satisfactory margin position is not available, the dynamic printed material application 202 formats the virtual content into one or more sections having the layout characteristics of the current section in step 365 and in step 367, displays the one or more sections with the formatted virtual content after the current section in the layout of the printed material. An example of a current section is a page. Layout characteristics for a page as a section include typical page layout settings. Some examples of such settings are margins, page number placement, interline spacing, spacing around pictures, font and font size. Some examples of the layout of the printed material may be a newspaper, a book, a magazine, or a greeting card. In the example of printed material as a book, the one or more sections formatted with the virtual content may be made to appear as additional pages of the book.

Figure 13:
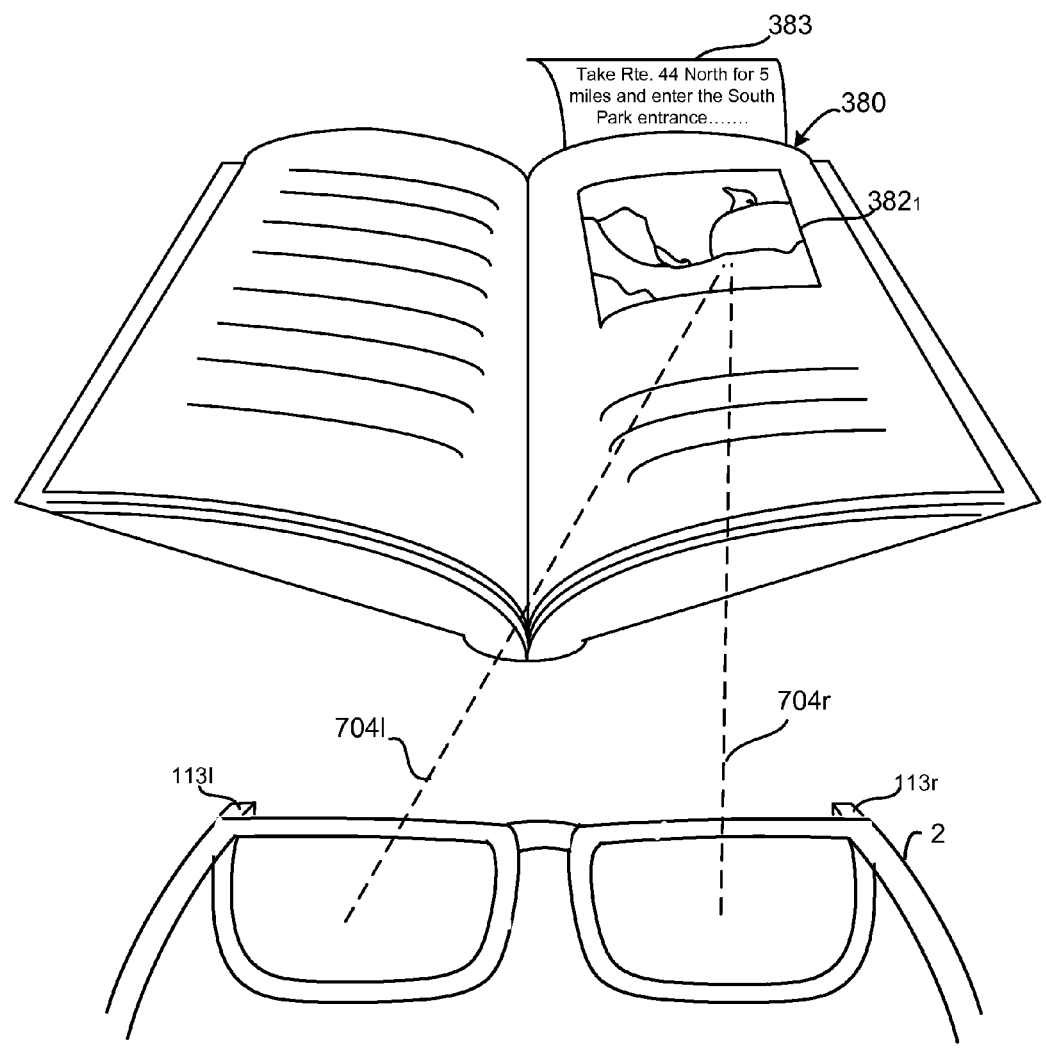
FIG. 13 illustrates an example of performing a directions task related to a printed content selection and a current location of a user of the see-through, near-eye, mixed reality display device system.

In the example of FIG. 9, the virtual data is formatted to appear within the perimeter of the physical printed material. In other examples, a floating position may also be a position option. For example, a margin space may appear to be extended to include a picture linked to a content selection for which annotations already take up the nearest margin space. In another example, a floating explanatory paragraph may appear to pop up perpendicularly out of the page in an interline space near a concept it explains. As illustrated in the example of FIG. 13 below, a virtual version of the printed content selection may be assigned a floating position linked to a user field of view rather than the printed material itself.

Figure 10:
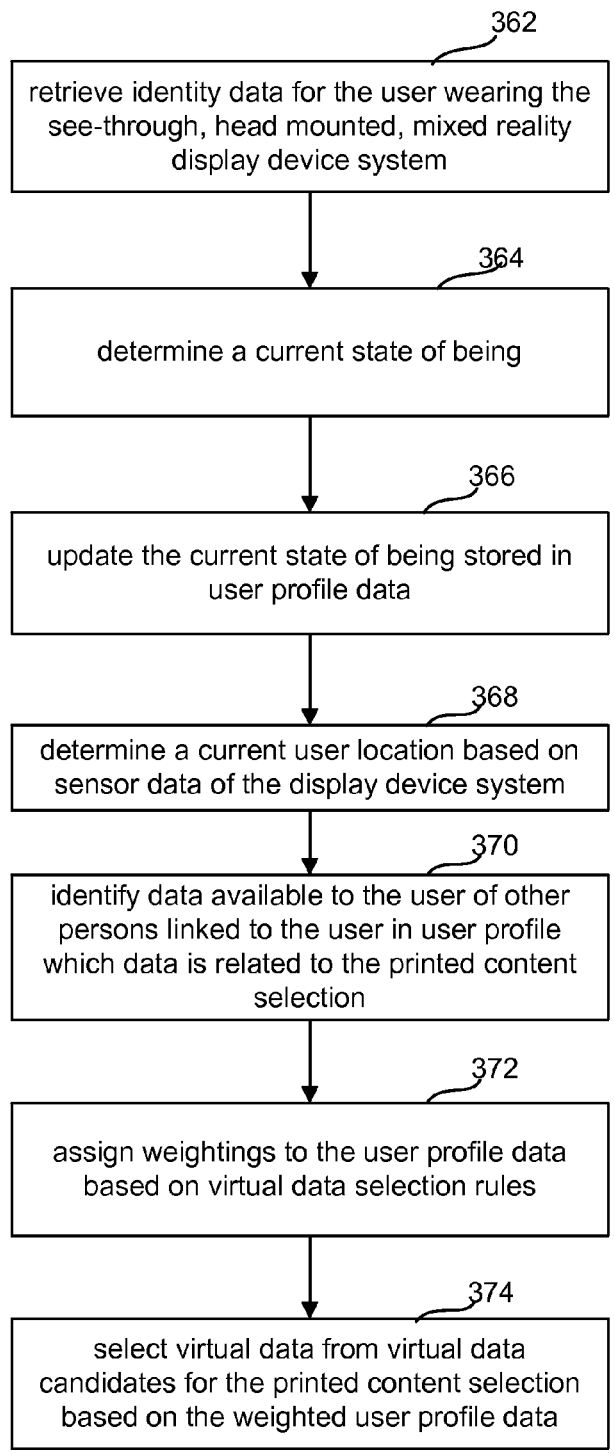
FIG. 10 is a flowchart of an implementation example of a process for selecting virtual data from available virtual data based on user profile data.

FIG. 10 is a flowchart of an implementation example of a process for selecting virtual data from available virtual data based on user profile data. In step 362, the dynamic printed material application 202 retrieves identity data for the user wearing the see-through, head mounted, mixed reality display device system. Furthermore, the application 202 determines in step 364 a current state of being. Some examples of settings are state of being settings like sleepy, awake, sleeping, being late for an appointment, strong emotion, and may also include activities e.g. eating, driving, traveling on a train.

A state of being may be determined from data sensed of the user's body as well as information tracked from other applications and location data as well. For example, based on location data and a calendar application, a state of being application may indicate the user is early or late for a meeting. Image data of the user's eye from an eye tracking assembly, also referred to as eye data, may indicate the user is experiencing strong emotion while also being late. More than one state of being may apply.

Some examples of user physical characteristics which may be identified in eye data and linked with a state of being in the state of being rules 179 are blinking rate, pupil size and pupil size changes. In some embodiments, the see-through display device system 8 may also have a biometric sensor like a pulse rate measuring sensor which presses against a user temple. One example of a physical characteristic which can indicate a state of being is blinking beyond a certain level as detected from image data, glint data, or sensors 128. Such blinking may indicate strong emotion. More simply, a detected closed eyelid for a period of time can indicate a state of being as "sleeping." A tearful state of the eye can also be detected from its reflectivity to indicate crying.

Pupil size and the pupil size stability may indicate a state of being sleepy or tired. Pupil size changes with lighting changes. If the pupil is treated as an ellipse, if the lighting does not change, one axis of the ellipse, the major axis, remains constant as it represents the diameter of the pupil. The width of the minor axis of the ellipse changes with gaze changes. The light meters (not shown) of the front facing cameras 113 can detect lighting changes. Therefore pupil dilation due to factors other than lighting changes can also be determined. Sleepiness and sleep deprivation may cause the pupil's overall size to shrink if tired, and the pupil size to become less stable, fluctuating in size. Pupil dilation beyond a criteria under steady state lighting conditions may also indicate a reaction to an emotional stimuli. However, pupil dilation may also be associated with activity.

Therefore, software such as a client push service application $204_1$ discussed below may correlate the pupil dilation with at least a state of being data setting of "strong emotion" if from image data from the outward or physical environment facing cameras 113 and small head movement indicated by the motion sensors 132 indicate the user is not exercising, for example, the user appears to be sitting down in his or her office. The object being viewed as indicated by the image data from the outward facing cameras 113 may provide more data, e.g. a young child looking at a picture of a real dinosaur skeleton or the printed content item has been identified as a particular scary novel, and based on time of day, location data and field of view data over time, the reader is home alone at night. In another example, the image data indicated a view of one of the user's typical lunchtime running paths and the motion sensors 132 indicated a running or jogging speed within a time period, e.g. two minutes, before a newspaper has been identified by the dynamic printed material application 202 in image data of the field of view. In this example, the state of being data settings may include "awake" and "neutral emotion" and may include "exercising" and "running" as activity data settings depending on time periods from stopping for identifying an end of an activity.

In one embodiment, either version, client or server, of the push application may include software for determining the state of being. The software may implement one or more heuristic algorithms based on the state of being rules 179 to determine a state of being of the user based on both the eye data and image and audio data of the user's surroundings. The client push service application $204_1$ updates the current state of being data stored in user profile data $197_1$, 197 in step 366.

A current user location based on sensor data of the display device system is determined in step 368. For example, the current user location can be identified by GPS data, image data of locations, and even IP addresses of network access points associated with particular locations. In step 370, the dynamic printed material application 202 identifies data available to the user of other persons linked to the user in user profile which data is related to the printed content selection. For example, if a printed content item is a scientific journal with an article by authors, and one of the user's social networking friends commented on the article on his social networking site page, the friend's comment would be identified.

In this embodiment, the dynamic printed application 202 in step 372, assigns weightings to the user profile data based on virtual data selection rules 198. In some examples, the virtual data selection rules may prioritize items from user profile data. For example, the following categories of user profile items may be prioritized in order starting from highest as identity data, state of being data, location data, the current or most recent printed content selection, the printed content item being viewed, and other users data related to the selection or item. In step 374, the dynamic printed application 202 selects virtual data from virtual data candidates for the printed content selection based on the weighted user profile data. For example, identity data may include languages known by the user. If the user only knows English, virtual data with English text has a higher probability of being selected than Spanish language virtual data. Also, as per the example below, for a five year old coloring in a coloring book, pictorial virtual data may be selected whereas virtual data including simple text may be displayed for a seven year old.

Figure 11:
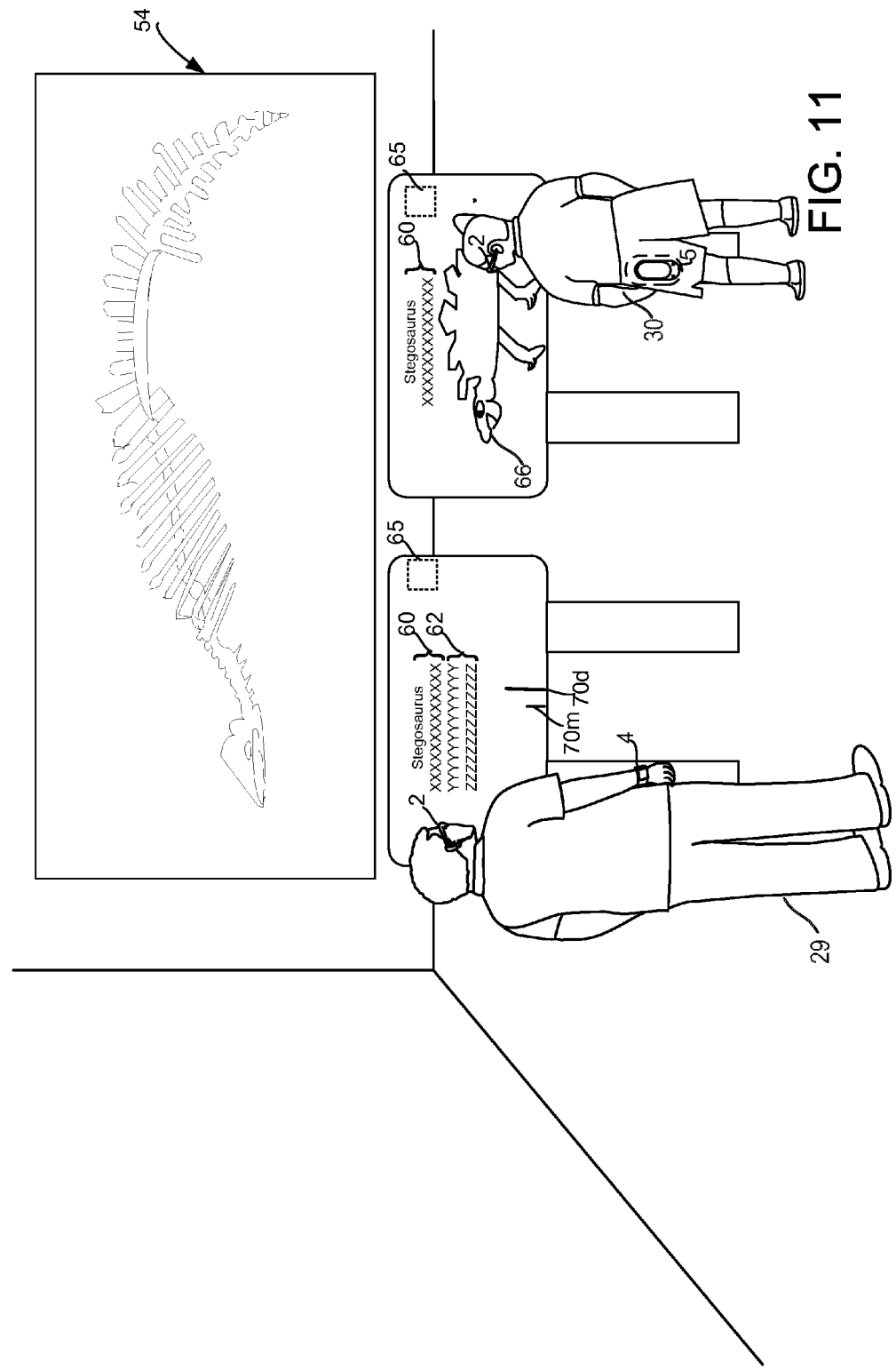
FIG. 11 illustrates an example of updating printed content with personalized virtual data in an example context of a museum placard.

FIG. 11 illustrates an example of updating printed content with personalized virtual data in an example context of a museum placard. In this example, an adult man 29 and a boy 30 of age 6 are both wearing see-through, near-eye, mixed reality display device systems 8. The adult wears a wrist based processing unit 4 in wireless communication with his display device 2, and the boy 30 has a processing unit embodied in a mobile device 5, also in wireless communication with his display device 2. They are both at a natural history museum which has a datastore comprising a print layout and location of each placard and sign in the museum as well as virtual data candidates which may be selected for display with a respective placard or sign. Via an application programming interface, a search engine of the museum registers and communicates with the dynamic printed material application 202 executing by each display device system 8 identified as being within the museum. The location of each device may be identified, for example, by GPS data of the device or an IP address received at a wireless access point of the museum.

Each of the man and the boy is looking at a respective printed medium of a real museum placard in this example near an exhibit 54 of a partial skeleton of a stegosaurus dinosaur. An invisible marker 65 transmits an identifier which the dynamic printed material application 202 can include in requests to the museum's database of virtual data via RFID or IR or Bluetooth to a corresponding receiver, e.g. one or more location sensors 144, on the display device system 8 within a range of the marker. In other examples, the content of the placard, e.g. the title Stegosaurus, would be the identifier. The printed material 60 on the placard states the name of the dinosaur type and includes brief explanatory text represented by XXX .... Based on user profile data, the adult man 29 is identified as a fluent English speaker, being 34 years old, of height 5 foot 7 inches, of neutral emotional state, and having a college degree in accounting. His TV tracking history indicates he has viewed 24 episodes of the TV program "Nature" over the past year and a half including one on dinosaur bones found in the Western United States. Metadata for the available virtual data candidates includes age, language, US reading levels, educational background and interest level in particular natural history subjects.

The dynamic printed material application 202 applies virtual data selection rules 198 and give highest priority to the man's age and language fluency. Based on the metadata available for the virtual data candidates, the man's educational background and TV history of watching natural history related programs also form a basis for forming a query for searching the metadata of the virtual data candidates. Image data of virtual text section 62 has been selected which provides additional details about the stegosaurus bone structure. Metadata stored for the virtual text section 62 indicates the text is suitable for person with an average U.S. college reading level, and above average knowledge of dinosaurs with respect to the general U.S. population based on a 2008 survey.

Line 70$m$ shows the adult's height compared to the height 70$d$ of the stegosaurus species from which the exhibit bones came.

Identity user profile data indicates the boy is 6 years old. His eye data indicates strong emotion, and crying has been indicated in the last 30 minutes. Speech recognition software has identified "I'm scared" being said by the voice of the boy 34 minutes ago from monitored audio received by the microphone on his device. Based on his locations being near dinosaur skeleton exhibits for the past hour, a heuristic algorithm implemented by his client push service application $204_1$ selects a state of being as fearful. According to the virtual data selection rules 198, a state of being of fearful causes state of being to receive a higher priority weighting from the dynamic application 202 in user profile data than if his state were a more emotionally neutral state. Age also has a highest priority weighting in this example. Virtual data 66 of an animation of a stegosaurus with softer features and a friendly eye as may be found in a children's book illustration is selected and displayed based on metadata associated with virtual data 66 indicating a target audience of children 7 and under, and animation. For a 6 year old user, the selection rules 198 weight non-text image data higher than text image data.

A parent may select content categories for a child via the information push service application 204 which stores the parental controls in the child's user profile data for access by the child's dynamic printed material application 202. That way a child can see content or content from categories that are not otherwise blocked by parental controls.

Figure 12A:
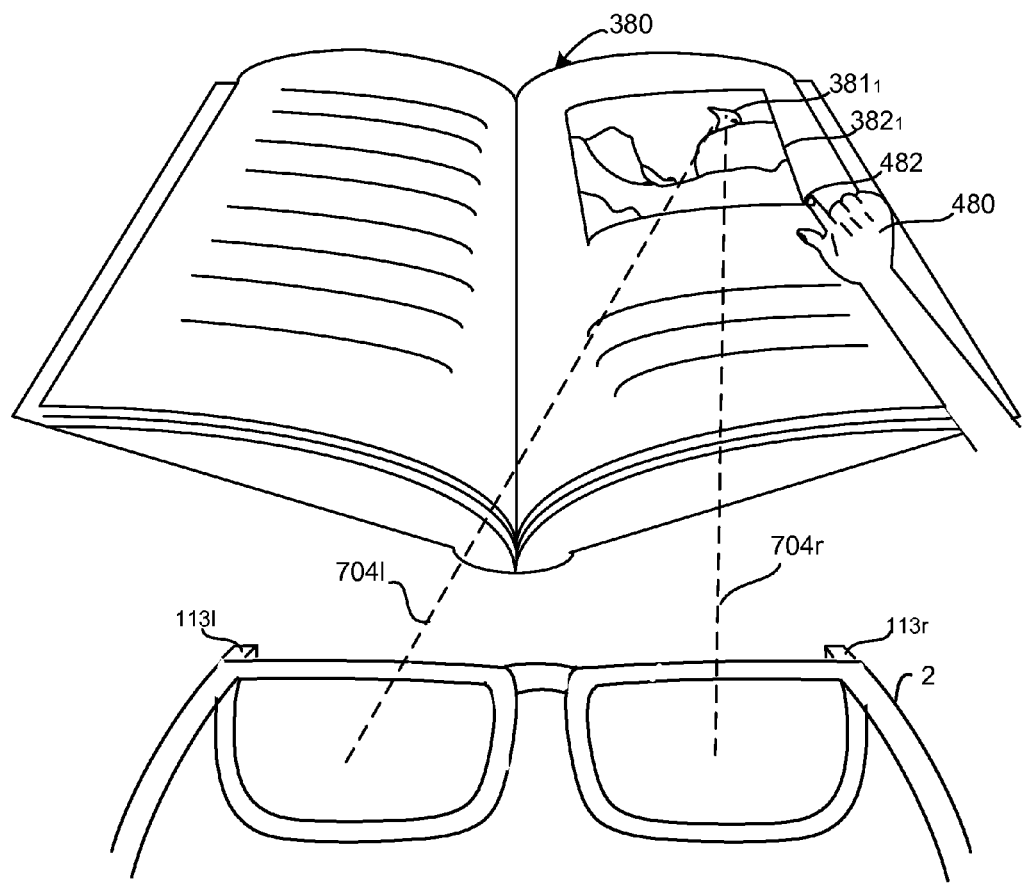
FIG. 12A illustrates an example of a gesture identifying user selection of a printed content selection within a book as an example of a printed content item.

FIG. 12A illustrates an example of a gesture identifying user selection of a printed content selection within a book as an example of a printed content item. Illustrated is a display device 2 with front facing cameras 113$l$ and 113$r$ for capturing user gestures such as the illustrated finger pointing gesture. Gestures performed by other body parts such as hands, wrists, forearms and even feet, elbows and the like can also be used to control applications like dynamic application 202. Hand and finger gestures allow the user to maintain reading material in the field of view of the display simultaneously with performing a gesture. Lines 704$l$ and 704$r$ represent eye lines of sight approximating gaze vectors from a user's pupils or retinas.

In this example, a user is viewing a guidebook 380 on U.S. National Parks including Yosemite National Park as a printed content item. As illustrated by the eye lines of sight 704$l$ and 704$r$, the user's point of gaze is Half Dome $381_1$ in a picture of the Yosemite Valley at a location known as the Valley View rest stop. The user's finger tip 482 of the user's hand 480 is pointing to the picture $382_1$ which the dynamic printed material application 202 identifies from field of view image data from the cameras 113$l$, 113$r$ as a gesture which is physical action user input selecting photo $382_1$ as a printed content selection.

In this example, the client push service application $204_1$ is executing and monitoring the applications executing on the user display device system including the dynamic printed material application 202. The client application sends at least a subset of the metadata 201 for the printed content selection to the information push service 204 which monitors applications and user profile data of other users who have granted access permission to the user. The information push service 204 identifies a photo having keywords in its metadata matching the metadata 201 of the printed content selection on a social networking site of a user friend, Sue. Based on a tracking history of which friends' pages on social networking sites the user has visited or who has visited Sue's page, the information push service 204 identifies that the user has not seen this recently posted photo. The information push service application 204 sends a copy of Sue's photo to the user's client push service application $204_1$ which notifies the dynamic printed material application 202. The dynamic application 202 may perform image comparison with the photo in the print layout of the guidebook to make sure the metadata on Sue's photo is accurate or to determine what is actually depicted. Assuming data results from the image comparison indicate a satisfactory relevancy score for Sue's photo according to the virtual data selection rules 198, Sue's photo is displayed as shown in FIG. 12B.

Figure 12B:
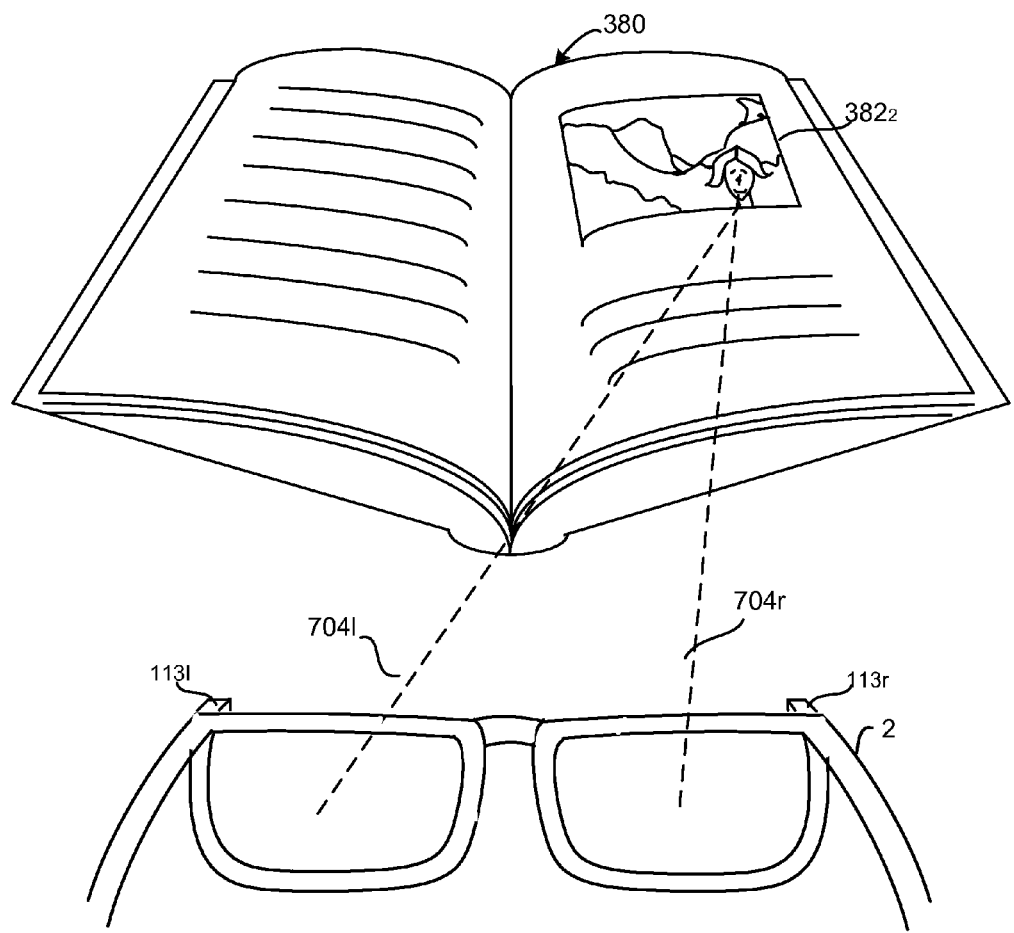
FIG. 12B illustrates an example of identifying and displaying data related to the printed content selection which data is data of another person identified in user profile data of the user received from another application.

FIG. 12B illustrates an example of identifying and displaying data related to the printed content selection which data is data of another person identified in user profile data of the user received from another application. In this example, Sue's photo $382_2$ of herself taken at the Valley View rest stop with Yosemite Valley in the background is displayed at a substitution position overlaying the guidebook picture.

Besides personalizing data based on a connection between a printed content selection or item and user profile data, a task or action implemented by an application is performed with respect to a printed content selection. FIGS. 13 through 16 illustrate example embodiments of tasks which may select and display virtual data based on user profile data.

FIG. 13 illustrates an example of performing a directions task related to a printed content selection and a current location of a user of the see-through, near-eye, mixed reality display device system. In this example, a user may initiate the directions task by physical action of a voice command like "directions" or a natural question of "How do I get there?" As described above, a user may have also defined a gesture for initiating the directions task. As the user's point of gaze is the picture, the dynamic printed material application 202 may request confirmation by outputting voice data of whether the destination is the Valley View rest stop or Half Dome. Once the destination is confirmed, the user's current location is confirmed. The dynamic application 202 may send the user current location as a starting point and the destination to another directions application as text data and format the results for display in a position registered to the picture of the Valley View. In this example, the directions are displayed in a floating position 383 on a virtual piece of paper extending out of a top margin nearest the picture 382₁. In other examples, particularly if the user's state of being indicates strong emotion or being sleepy, and how close the user's location is to the destination, non-literary visual symbols like arrows may augment the text of the directions or be used instead. In other examples, if the user is fluent in multiple languages, but is tired, the directions may be displayed in the language in which the user is most fluent based on language usage amount tracked in audio data and fluency as determined by speech recognition software.

Figure 14A:
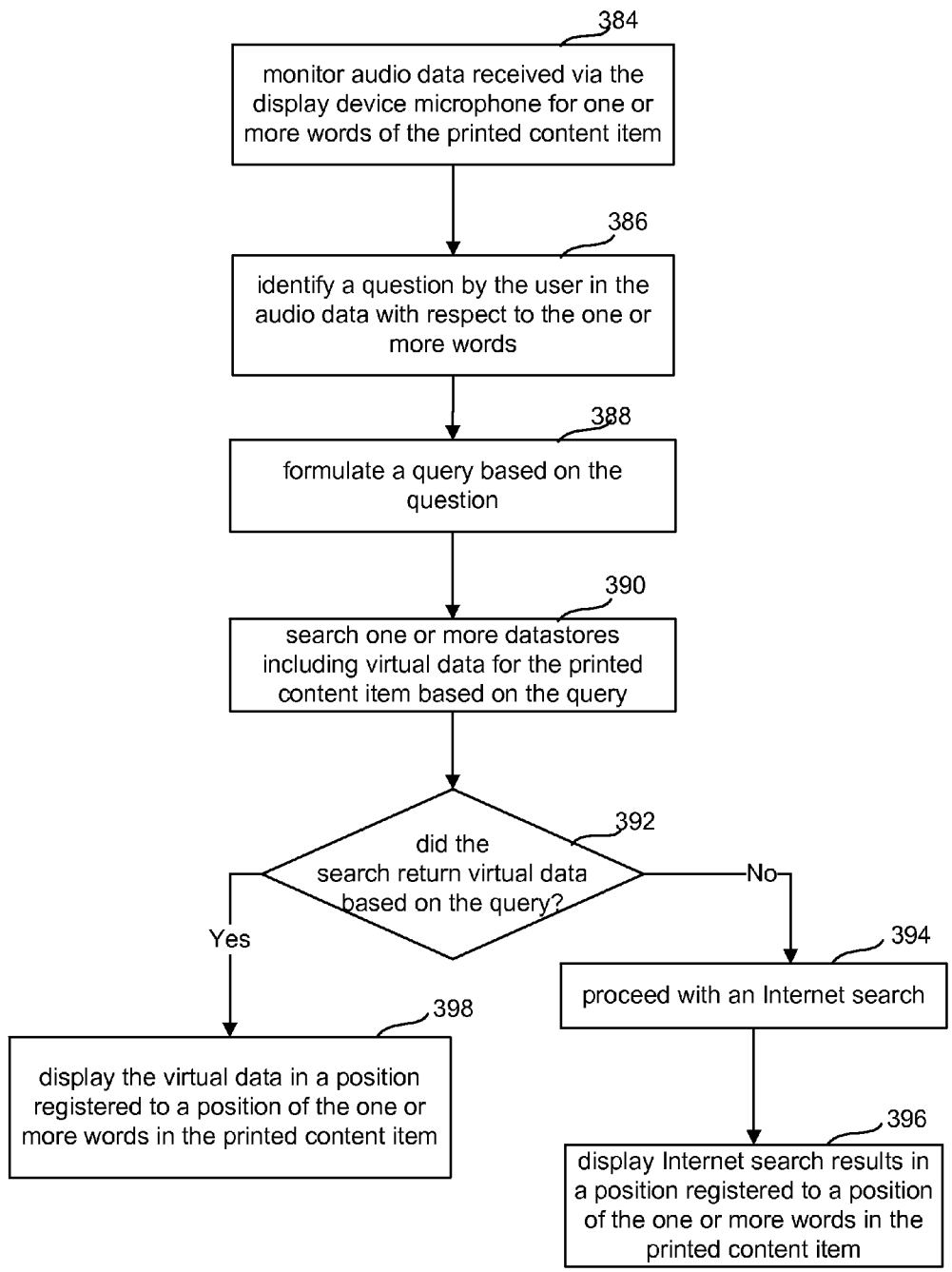
FIG. 14A is a flowchart of an implementation example of a process for performing a learning assistance task which retrieves virtual data based on a user question.

FIG. 14A is a flowchart of an implementation example of a process for performing a learning assistance task which retrieves virtual data based on a user question. To assist with such a learning assistance task, particularly for textbooks and non-fiction works, publishers may have prepared inserts as virtual data on different topics of interest to different readers. In some examples, a reference cited may be available as a virtual insert which may be registered to a printed content selection which it supports. In other examples, the virtual insert may be a tutorial on a topic of interest which a user may identify by asking a question to another human, such as a teacher or professor, in a class, or friend while doing homework, or even by directing the question to the book or other printed medium.

In the implementation process example illustrated in FIG. 14A, under the control of the dynamic printed material application 202, the sound recognition engine 194 in step 384 monitors audio data received via the display device microphone for one or more words of the printed content item and in step 386 identifies a question by the user in the audio data with respect to the one or more words. For example, the sound recognition engine 194 can identify a question from the words used and their order in a sequence between gaps in voice data and voice change rules such as a voice goes up in volume near the end of a question. The sound recognition engine 194 accesses models of human speech patterns, particularly for the linguistic background of the user, for identifying a question from a statement. The dynamic printed material application 202 is notified and in step 388 formulates a query based on the one or more words of the printed content item and the question and in step 390 searches one or more datastores including virtual data based on the query. An example of such a datastore is the publishers databases 207, e.g. the printed content item's publisher, and the Internet indexed resources 209. In step 392, the dynamic application 202 determines whether the search returned virtual data based on the query, and if so, the dynamic application 202 causes the image generation unit in step 398 to display the virtual data in a position registered to the one or more words in the printed content item.

If the search did not return virtual data based on the query, the dynamic printed material application 202 may proceed with an Internet search in step 394 and then format and cause to be displayed in step 396 any Internet search results in a position registered to a position of the one or more words in the printed content item.

Figure 14B:
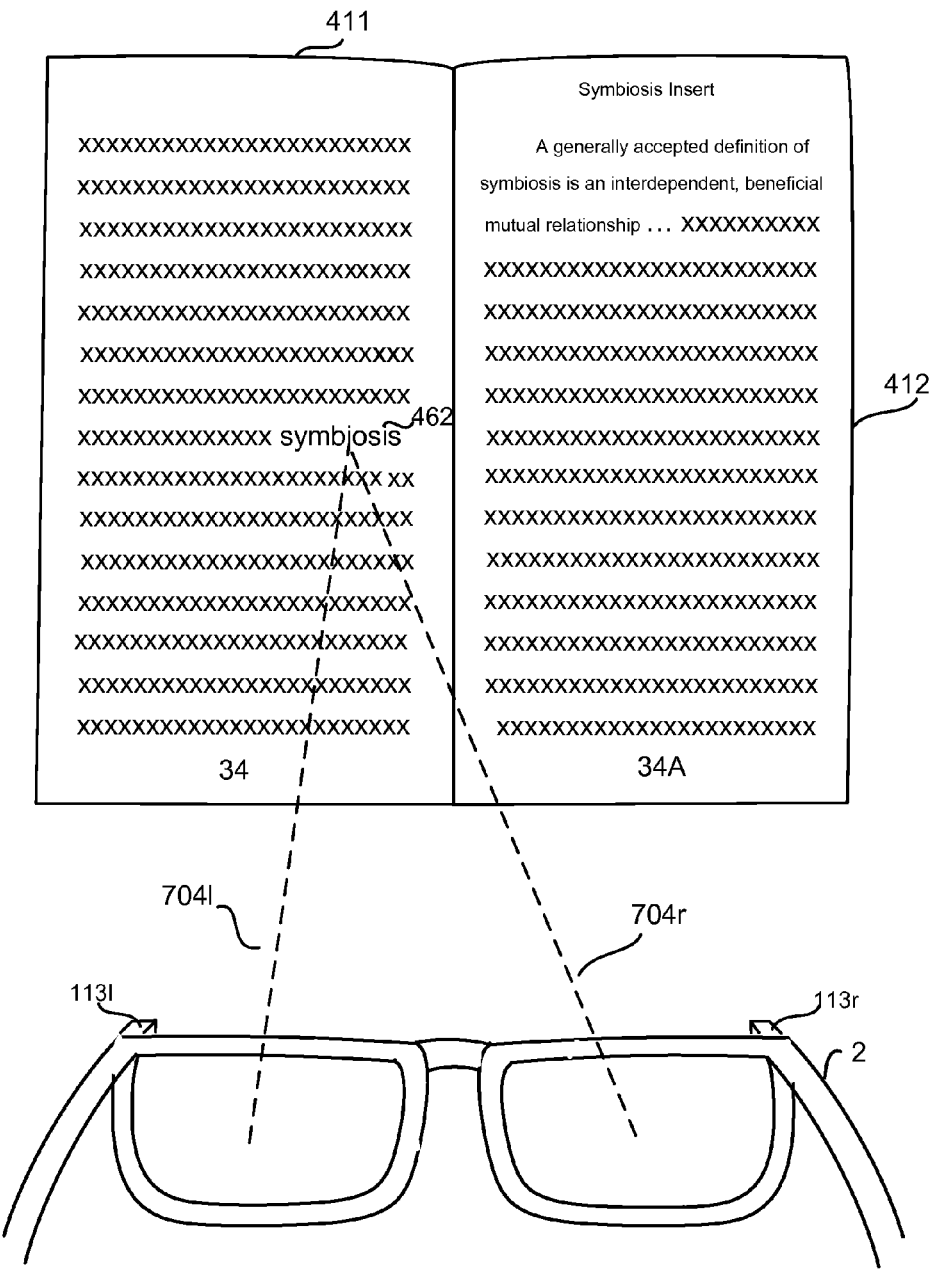
FIG. 14B illustrates an example of the learning assistance task displaying virtual data formatted on one or more virtual pages appearing to be inserted as one or more adjacent pages to a page including the printed content selection.

FIG. 14B illustrates an example of the learning assistance task displaying virtual data formatted on one or more virtual pages appearing to be inserted as one or more adjacent pages to a page including the printed content selection. In the example, the dynamic printed material application 202 in conjunction with the sound recognition engine 194 has identified that a user has asked a question about symbiosis in her high school biology class. When she opens her text book 411 to page 34 which discusses symbiosis 462, a virtual insert 412 beginning on virtual page 34A entitled "Symbiosis Insert" appears as an opposite and adjacent page.

Figure 15A:
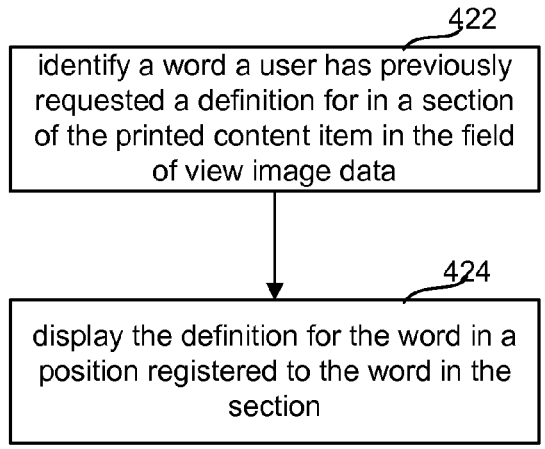
FIG. 15A is a flowchart of an implementation example of a process for performing an example of a word learning assistance task.

FIG. 15A is a flowchart of an implementation of a process for performing an example of a word learning assistance task. This task helps reinforce learning of new words for a user. The dynamic printed material application 202 identifies in step 422 a word a user has previously requested a definition for in a section of the printed content item in the field of view image data, and in step 424 displays the definition for the word in a position registered to the word in the section. An example of a section is a page.

Figure 15B:
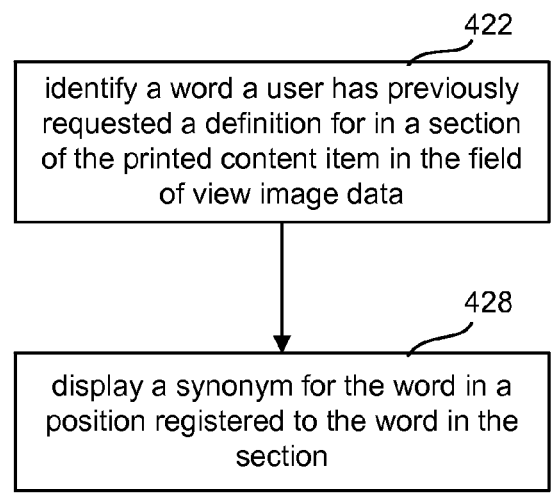
FIG. 15B is a flowchart of another implementation example of a process for performing an example of a word learning assistance task.

FIG. 15B is a flowchart of another implementation of a process for performing an example of a word learning assistance task. In this version, step 422 is performed, but the dynamic printed material application 202 displays a synonym for the word in step 428 in a position registered to the word in the section.

Figure 15C:
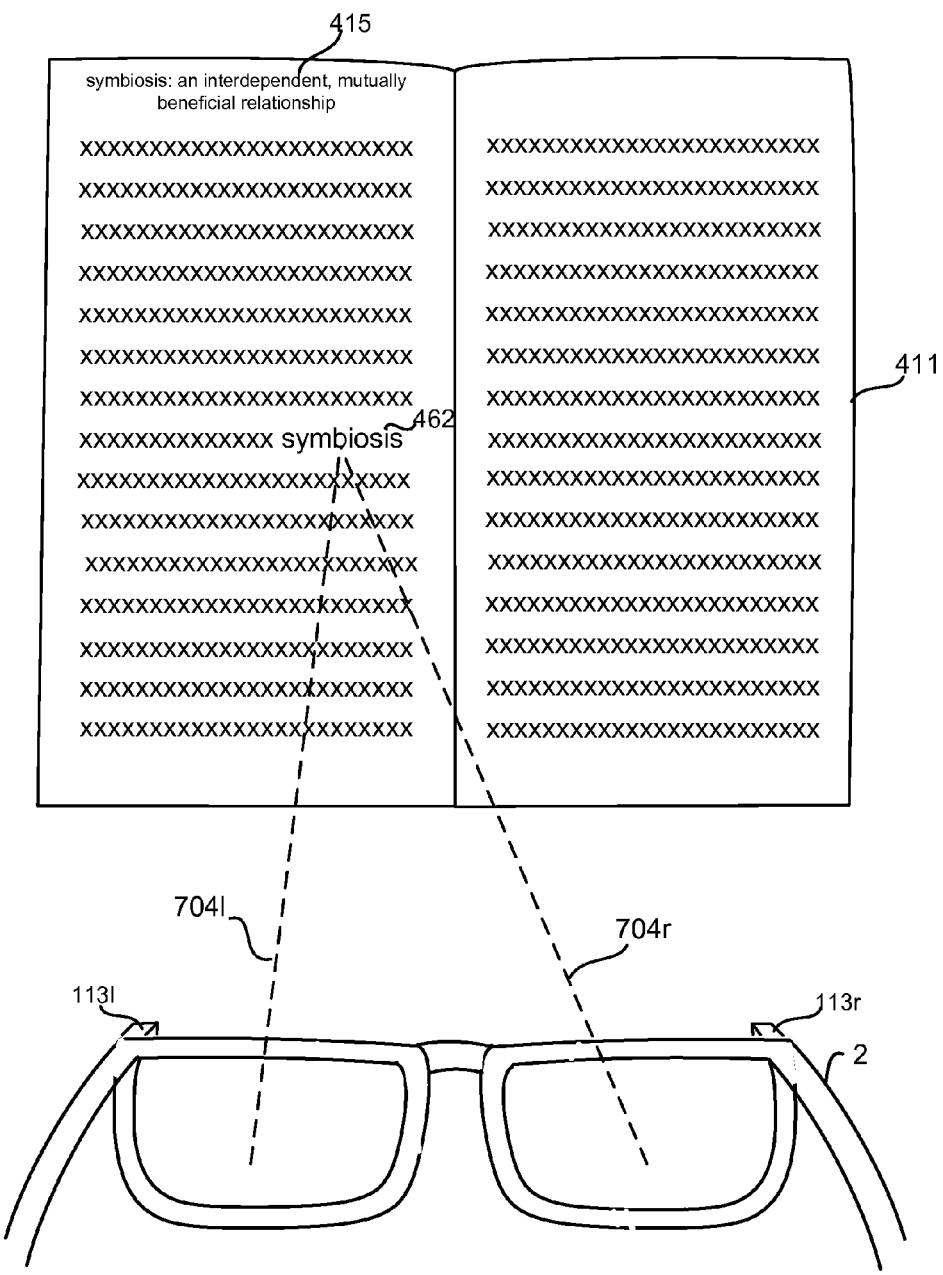
FIG. 15C illustrates an example of the word learning assistance task displaying a definition of a word.

FIG. 15C illustrates an example of the word learning assistance task displaying a definition of a word. As the user's gaze is on the word symbiosis 462 for which the user has previously requested a definition, a definition 415 for symbiosis appears in the top margin. The top margin may have been selected for example due to visibility criteria as per the method embodiment of FIG. 9.

Figure 15D:
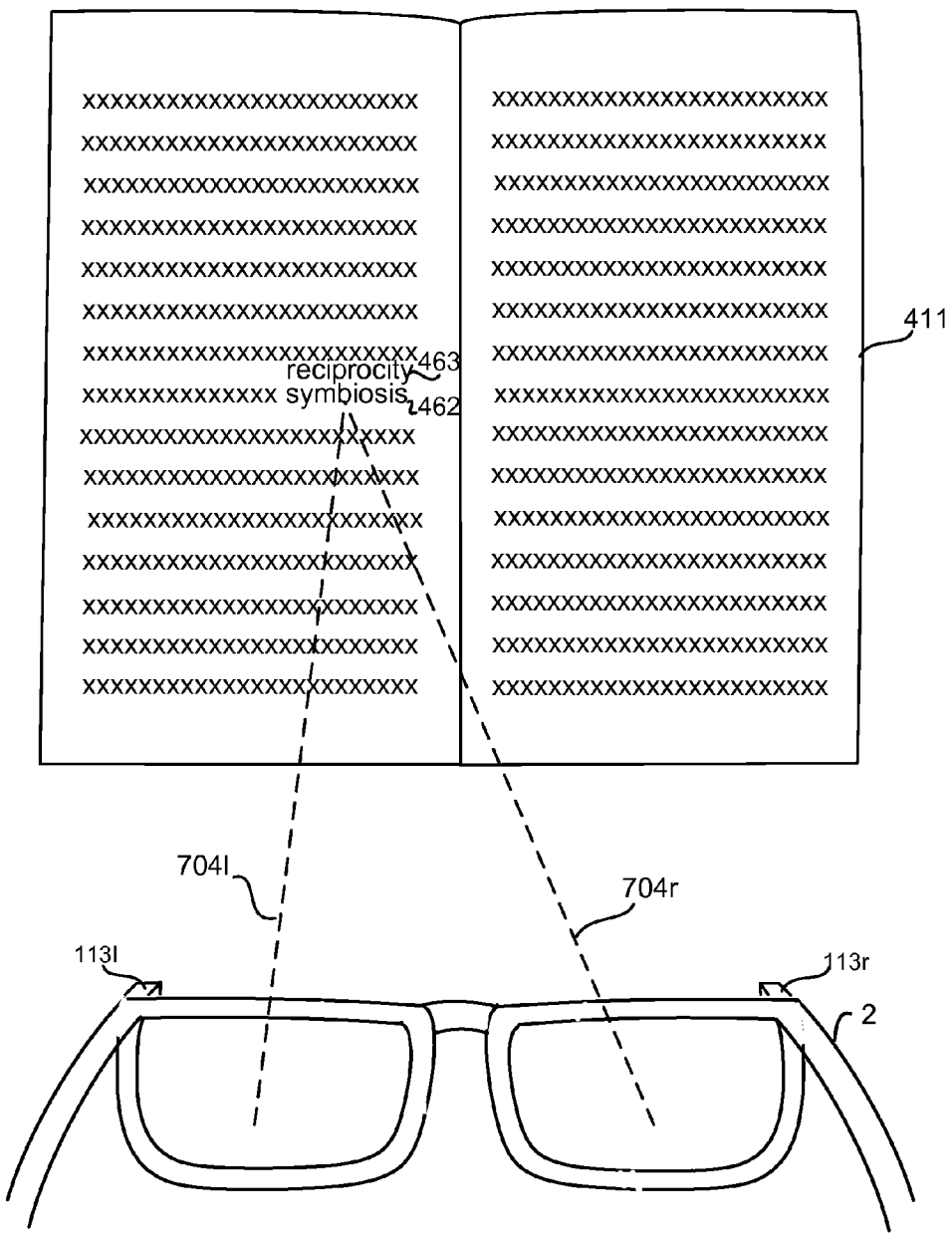
FIG. 15D illustrates an example of the word learning assistance task displaying a synonym of a word.

FIG. 15D illustrates an example of the word learning assistance task displaying a synonym of a word. This example differs from the example of FIG. 15C in that a synonym, reciprocity 463, is displayed at an interline position above the word symbiosis for which the user had previously requested a definition.

Figure 16:
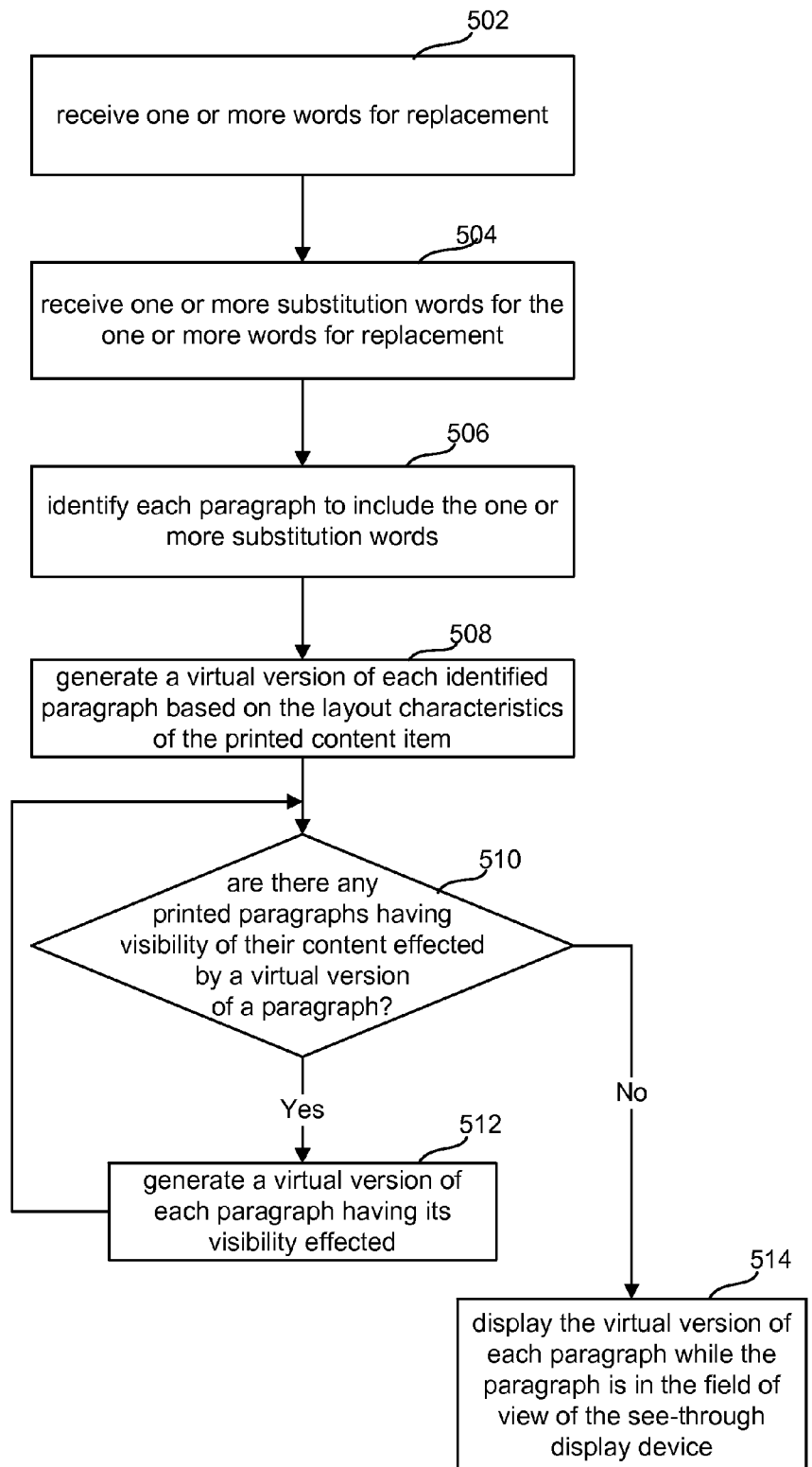
FIG. 16 is a flowchart of an implementation of a process for performing a task which allows the user to replace at least one word with one or more other words in a printed content item.

FIG. 16 is a flowchart of an implementation of a process for performing a task which allows the user to replace at least one word with one or more other words in a printed content item. Some examples of at least one word to replace are names of characters or locations. For example, the user may select her name and some names of her friends to replace character names, and location names are replaced with names of her neighborhood places. In order to replace a word in a printed content item and have the at least one word appear like the rest of the words in the printed content item, the text surrounding the replaced word or words has its spacing adjusted by virtual data. Typically, a virtual version of at least each paragraph including the one or more replacement words is generated with adjusted spacing. If the replacement causes the paragraph to extend to another line or onto another page, a virtual version of at least one following paragraph with adjusted spacing is generated. When a virtual paragraph again ends in the same layout position of the printed paragraph it is registered to, generation of another virtual paragraph can stop.

In step 502, the dynamic printed material application 202 receives one or more words for replacement and in step 504 receives one or more substitution words for the one or more words for replacement via user input. For example, a user may enter the words for replacement and substitution via a virtual menu, a user input device of the processing unit 4, or via audio data listing for example locations, or pointing at people and character names or gaze duration at people and character names and the like. In step 506, each paragraph to include the one or more substitution words is identified, and in step 508, a virtual version of each identified paragraph is generated based on layout characteristics of the printed content item. Some examples of layout characteristics are font, margin spacing and line spacing. Basically, the goal is to make the substituted words appear as if they were originally printed in the book.

Other than the unusual case where a word substituted and replaced has the same dimensions, e.g. same number of letters and the combined letter width is the same, the substituted words will either shorten or lengthen paragraphs. In step 510, the dynamic application 510 determines whether there are any paragraphs having visibility of their content effected by a virtual version of a paragraph. Visibility of a printed paragraph may be effected by being partially overlaid by a virtual paragraph. If not, then the virtual paragraph versions for the printed content item are complete and then each virtual version paragraph is displayed while the paragraph is in the field of view of the see-through display device 2 in step 514. Otherwise, a virtual version of each paragraph having its visibility effected is generated in step 512. As each time a virtual paragraph is generated, the visibility of a printed paragraph may be effected, the determination of step 510 is repeated until there are no more printed paragraphs with effected visibility. There may be extra line spaces here and there if the substituted words are shorter using this process, but that is less distracting than changes in font size or line spacing and such.

FIG. 17 is a block diagram of one embodiment of a computing system that can be used to implement one or more network accessible computing systems 12 which may host at least some of the software components of computing environment 54 or other elements depicted in FIG. 3. With reference to FIG. 17, an exemplary system for implementing the invention includes a computing device, such as computing device 800. In its most basic configuration, computing device 800 typically includes one or more processing units 802 and may include different types of processors as well such as central processing units (CPU) and graphics processing units (GPU). Computing device 800 also includes memory 804. Depending on the exact configuration and type of computing device, memory 804 may include volatile memory 805 (such as RAM), non-volatile memory 807 (such as ROM, flash memory, etc.) or some combination of the two. This most basic configuration is illustrated in FIG. 17 by dashed line 806. Additionally, device 800 may also have additional features/functionality. For example, device 800 may also include additional storage (removable and/or non-removable) including, but not limited to, magnetic or optical disks or tape. Such additional storage is illustrated in FIG. 17 by removable storage 808 and non-removable storage 810.

Device 800 may also contain communications connection(s) 812 such as one or more network interfaces and transceivers that allow the device to communicate with other devices. Device 800 may also have input device(s) 814 such as keyboard, mouse, pen, voice input device, touch input device, etc. Output device(s) 816 such as a display, speakers, printer, etc. may also be included. All these devices are well known in the art and need not be discussed at length here.

Figure 18:
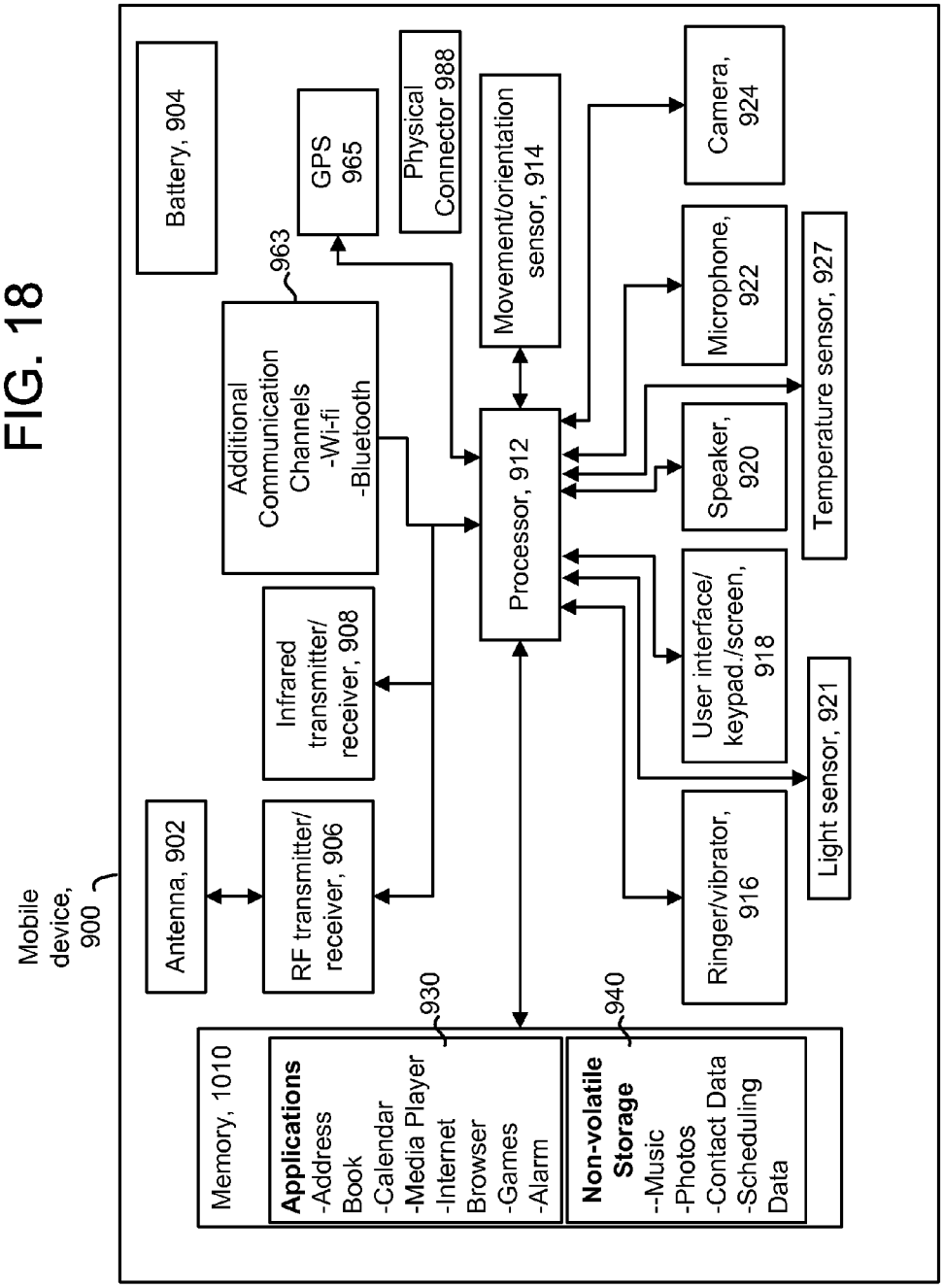
FIG. 18 is a block diagram of an exemplary mobile device which may operate in embodiments of the technology.

As discussed above, the processing unit 4 may be embodied in a mobile device 5. FIG. 18 is a block diagram of an exemplary mobile device 900 which may operate in embodiments of the technology. Exemplary electronic circuitry of a typical mobile phone is depicted. The phone 900 includes one or more microprocessors 912, and memory 910 (e.g., non-volatile memory such as ROM and volatile memory such as RAM) which stores processor-readable code which is executed by one or more processors of the control processor 912 to implement the functionality described herein.

Mobile device 900 may include, for example, processors 912, memory 1010 including applications and non-volatile storage. The processor 912 can implement communications, as well as any number of applications, including the interaction applications discussed herein. Memory 1010 can be any variety of memory storage media types, including non-volatile and volatile memory. A device operating system handles the different operations of the mobile device 900 and may contain user interfaces for operations, such as placing and receiving phone calls, text messaging, checking voicemail, and the like. The applications 930 can be any assortment of programs, such as a camera application for photos and/or videos, an address book, a calendar application, a media player, an internet browser, games, other multimedia applications, an alarm application, other third party applications like a skin application and image processing software for processing image data to and from the display device 2 discussed herein, and the like. The non-volatile storage component 940 in memory 910 contains data such as web caches, music, photos, contact data, scheduling data, and other files.

The processor 912 also communicates with RF transmit/receive circuitry 906 which in turn is coupled to an antenna 902, with an infrared transmitted/receiver 908, with any additional communication channels 960 like Wi-Fi, WUSB, RFID, infrared or Bluetooth, and with a movement/orientation sensor 914 such as an accelerometer. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. The processor 912 further communicates with a ringer/vibrator 916, a user interface keypad/screen, biometric sensor system 918, a speaker 920, a microphone 922, a camera 924, a light sensor 921 and a temperature sensor 927.

The processor 912 controls transmission and reception of wireless signals. During a transmission mode, the processor 912 provides a voice signal from microphone 922, or other data signal, to the RF transmit/receive circuitry 906. The transmit/receive circuitry 906 transmits the signal to a remote station (e.g., a fixed station, operator, other cellular phones, etc.) for communication through the antenna 902. The ringer/vibrator 916 is used to signal an incoming call, text message, calendar reminder, alarm clock reminder, or other notification to the user. During a receiving mode, the transmit/receive circuitry 906 receives a voice or other data signal from a remote station through the antenna 902. A received voice signal is provided to the speaker 920 while other received data signals are also processed appropriately.

Additionally, a physical connector 988 can be used to connect the mobile device 900 to an external power source, such as an AC adapter or powered docking station. The physical connector 988 can also be used as a data connection to a computing device. The data connection allows for operations such as synchronizing mobile device data with the computing data on another device.

A GPS receiver 965 utilizing satellite-based radio navigation to relay the position of the user applications is enabled for such service.

The example computer systems illustrated in the figures include examples of computer readable storage devices. Computer readable storage devices are also processor readable storage device. Such devices may include volatile and nonvolatile, removable and non-removable memory devices implemented in any method or technology for storage of information such as computer readable instructions, data structures, program modules or other data. Some examples of processor or computer readable storage devices are RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other device which can be used to store the desired information and which can be accessed by a computer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A machine-implemented method of augmenting real printed content with personalized virtual data that is personalized for a user wearing a near-eye, mixed reality display device, the method comprising:

retrieving identity data for a user wearing a near-eye, mixed reality display device;

identifying a printed content item viewable through and in a field of view of the near-eye, mixed reality display device, the identified item being real and providing real printed content;

identifying user selection of a printed content portion within the real printed content of the printed content item based on physical action user input;

determining whether personalizable virtual data is available for the user selected printed content portion;

responsive to the personalizable virtual data being determined to be available for the user selected printed content portion, selecting personalized virtual data from the determined to be available virtual data based on user profile data corresponding to the retrieved identity data for the user wearing the near-eye, mixed reality display device, wherein the selecting of the personalized virtual data from the available personalizable data includes selecting the personalized virtual data based on a current state of being of the user, the current state of being of the user including an emotional state of the user; and causing display of the selected, personalized virtual data in the field of view of the near-eye, mixed reality display device and in a position registered to a position of the user selected printed content portion of the automatically identified printed content item.

2. The method of claim 1 further comprising determining a current state of being of the user based on eye tracking data and updating the current state of being stored in user profile data.

3. The method of claim 1 wherein,
the retrieved identity data includes including a user age; and
wherein the selecting of personalized virtual data from the available personalizable virtual data based on user profile data includes selecting age appropriate virtual data based on the user age.

4. The method of claim 1 wherein,
the retrieved identity data includes a current user location; and
wherein the selecting of personalized virtual data from the available personalizable virtual data based on user profile data includes selecting virtual data based on the current user location.

5. The method of claim 1 further comprising:
accessing data related to the printed content selection and another person identified in the user profile data of the user; and
wherein the selecting of personalized virtual data from the available personalizable virtual data based on user profile data includes selecting the data about the other person for the virtual data.

6. The method of claim 1 further comprising:
storing the virtual data with a registration to content embodied in the printed content selection in a layout of a medium independent version of a work embodied in the printed content item, the layout of the medium independent version of the work is independent of printed media.

7. A near-eye, mixed reality display device system configured to automatically augment real printed content with personalized virtual data, the system comprising:

a display positioned by a support structure;

at least one outward facing camera positioned on the support structure for capturing image data of a field of view of real objects disposed beyond the display;

one or more software controlled processors having access to user profile data of a user of the display, the user profile data being stored in a memory and being communicatively coupled to a search engine having access to one or more datastores including content, layout and virtual data for works and printed content items embodying the works;

the one or more software controlled processors communicatively coupled to the at least one outward facing camera for receiving image data of the field of view of the camera and being configured for automatically identifying user physical action indicative of the user selecting a printed content portion in a printed content item among the real objects within the field of view of the camera, the identified action being directed to a real printed content providing item that provides real printed content;

the one or more software controlled processors being configured for determining a current state of being of the user, the current state of being of the user including an emotional state of the user, and storing the current state of being in the user profile data of the user;

the one or more software controlled processors being configured for automatically selecting user-personalized virtual data from the one or more datastores based on the user profile data of the user including based on the current state of being and based on the user selected printed content portion of the real printed content providing item; and the one or more software controlled processors being configured for causing at least one communicatively coupled image generation unit for the display to display the automatically selected virtual data as being automatically registered with a field of view position of the printed content portion.

8. The system of claim 7 wherein the one or more software controlled processors being for identifying physical action user selection of a printed content selection in a printed content item based on the image data of the field of view further comprises identifying one or more gestures identifying selection of the printed content selection from the image data of the field of view.

9. The system of claim 7 further comprising one or more eye tracking assemblies positioned by the support structure for capturing image data of each eye and communicatively coupled to the one or more software controlled processors for sending image data of each eye;

wherein identifying physical action user selection of a printed content selection in a printed content item based on image data of the field of view further comprises the one or more software controlled processors identifying from the image data of each eye a physical action of gaze duration;

the one or more software controlled processors identifying from the image data of the field a view that a point of gaze is a printed content object in the field of view of the displays; and responsive to the gaze duration exceeding a threshold, selecting the printed content object as a printed content selection.

10. The system of claim 7 further comprising:

a memory for storing data and software including software for converting text in image data to text in a computer standardized text data storage format; and wherein the one or more software controlled processors being for identifying a printed content item including the printed content selection and a work including a medium independent version of the printed content selection based on formulating one or more queries based on the image data and sending the one or more queries to the search engine further comprises the one or more software controlled processors identifying one or more version identifying sections of the printed content item in image data, the one or more software controlled processors formulating and sending a query based on the one or more version identifying sections to the communicatively coupled search engine, and the one or more software controlled processors receiving a printed content item version identifier.

11. The system of claim 10 further comprising:

the one or more software controlled processors requesting and receiving from the datastores based on the printed content item version identifier, position data for the printed content selection within a layout of the printed content item, a medium independent work identifier, work position data for the medium independent version of the printed content selection in terms of a medium independent subdivision, and any applicable medium independent work version identifier and work version position data in terms of the medium independent subdivision.

12. The system of claim 11 further comprising:

the one or more software controlled processors searches for virtual data candidates related to the printed content selection based on the work identifier, the work version identifier, and the printed content item version identifier; and the one or more software controlled processors selects one of the virtual data candidates as virtual data for display based on user profile data.

13. The system of claim 12 further comprising:

the one or more software controlled processors identifying a task to be performed with respect to the printed content selection based on identifying one or more gestures from the image data of the field of view; and displaying the virtual data selected for display based on user profile data related to the content selection in accordance with the task.

14. One or more processor readable non-volatile storage devices having instructions encoded thereon for causing one or more processors to execute a machine-implemented method for augmenting real printed content with user personalized virtual data for a user wearing and using a near-eye, mixed reality display device, the method comprising:

identifying a real printed content item in a field of view of the near-eye, mixed reality display device, the identified item being real and providing real printed content;

determining a task related to the identified printed content item based on detected physical action of the user directed to a user selected portion of the real printed content; and performing the task which further includes:

determining a current state of being of the user wearing the near-eye, mixed reality display device, the current state of being of the user including an emotional state of the user, and storing the current state of being of the user, selecting an output format for personalized virtual data associated with the task based on the current state of being of the user, the output format being from the group consisting of non-literary visual symbols, a language of text, and audio data, and outputting the personalized virtual data in accordance with the task and placed in registration with the user selected portion of the real printed content.

15. The one or more processor readable non-volatile storage devices of claim 14 wherein performing the task further comprises performing a learning assistance task by monitoring audio data captured by a microphone of the near-eye mixed reality device for one or more words of the printed content item;

identifying by speech recognition software a question by the user with respect to the one or more words of the printed content item;

formulating a query based on the question;

searching one or more datastores including virtual data for the printed content item based on the query; and responsive to receiving virtual data based on the query, displaying the virtual data in a position registered to a position of the one or more words in the printed content item.

16. The one or more processor readable non-volatile storage devices of claim 14 wherein the virtual data is formatted on one or more virtual pages appearing to be inserted as one or more adjacent pages to a page including the one or more words.

17. The one or more processor readable non-volatile storage devices of claim 14 wherein performing the task further comprises identifying a word for which a user has previously requested a definition in a section of the printed content item in the image data of the field of view; and displaying the definition for the word in a position registered to the word in the section.

18. The one or more processor readable non-volatile storage devices of claim 14 wherein performing the task further comprises identifying a word a user has previously requested a definition for in a section of the printed content item in the image data of the field of view; and displaying a synonym for the word in a position registered to the word in the section.

* * * * *